(12) United States Patent
Watanabe et al.

(10) Patent No.: US 8,325,293 B2
(45) Date of Patent: Dec. 4, 2012

(54) PRODUCTION METHOD OF LIGHT SCATTERING FILM, LIGHT SCATTERING FILM, POLARIZING PLATE, IMAGE DISPLAY DEVICE, AND TRANSMISSIVE/SEMI-TRANSMISSIVE LIQUID CRYSTAL DISPLAY DEVICE

(75) Inventors: Jun Watanabe, Minami-Ashigara (JP); Hiroyuki Yoneyama, Minami-Ashigara (JP); Daisaku Abiru, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 316 days.

(21) Appl. No.: 12/749,773

(22) Filed: Mar. 30, 2010

(65) Prior Publication Data
US 2010/0245714 A1    Sep. 30, 2010

(30) Foreign Application Priority Data
Mar. 30, 2009    (JP) .................................. 2009-083792

(51) Int. Cl.
*G02F 1/1335* (2006.01)
*G02B 5/02* (2006.01)
*G02B 1/08* (2006.01)
*B05D 5/06* (2006.01)
*B05D 3/02* (2006.01)

(52) U.S. Cl. ............ 349/64; 349/187; 349/166; 349/96; 359/599; 359/485.01; 427/164; 427/162; 362/97.1

(58) Field of Classification Search .................. 349/187, 349/56, 62, 64, 96, 61, 112, 166, 201; 438/30; 362/97.1, 97.2, 97.3, 97.4; 427/163.1, 161, 427/163.4, 164; 359/485.01, 599
See application file for complete search history.

(56) References Cited

U.S. PATENT DOCUMENTS

| 7,374,328 B2 * | 5/2008 | Kuroda et al. ................ 362/620 |
| 7,553,059 B2 * | 6/2009 | Kuroda et al. ................ 362/607 |
| 2007/0121211 A1 | 5/2007 | Watanabe et al. |

(Continued)

FOREIGN PATENT DOCUMENTS
JP    2000-075134 A    3/2000
(Continued)

OTHER PUBLICATIONS

Japanese Office Action (Notification of Reasons for Refusal) dated Jun. 12, 2012, issued in corresponding Japanese Patent Application No. 2009-083792. (15 pages).

*Primary Examiner* — Brian Healy
(74) *Attorney, Agent, or Firm* — Buchanan Ingersol & Rooney PC

(57) ABSTRACT

A method for producing a light scattering film is provided and includes: casting onto a support a dope containing at least a thermoplastic resin and light transmitting particles to provide a casted film, and peeling and drying the casted film to prepare a light transmitting base material; applying an coating solution containing at least a curable compound, a polymerization initiator, and a solvent onto the light transmitting base material and drying the solvent; and curing the curable compound to form a cured layer. At least one surface of the light transmitting base material has an asperity shape, the light transmitting particles have an average primary particle size greater than 2.5 μm but not greater than 12 μm, the cured layer has an average thickness of 0.1 μm or greater but not greater than 10.0 μm, and the cured layer satisfies the specific formulae.

16 Claims, 6 Drawing Sheets

U.S. PATENT DOCUMENTS

| | | |
|---|---|---|
| 2007/0229804 A1 | 10/2007 | Inoue et al. |
| 2008/0247045 A1 | 10/2008 | Suzuki et al. |
| 2008/0260997 A1 | 10/2008 | Iwata et al. |
| 2009/0087617 A1 | 4/2009 | Suzuki et al. |
| 2010/0245714 A1* | 9/2010 | Watanabe et al. ............... 349/64 |
| 2010/0245715 A1* | 9/2010 | Watanabe et al. ............... 349/64 |
| 2010/0277674 A1* | 11/2010 | Watanabe et al. ............... 349/96 |
| 2012/0081635 A1* | 4/2012 | Fukuda et al. .................. 349/64 |

FOREIGN PATENT DOCUMENTS

| | | |
|---|---|---|
| JP | 2000-258612 | 9/2000 |
| JP | 2001-172403 A | 6/2001 |
| JP | 2003-025504 A | 1/2003 |
| JP | 2005-156801 | 6/2005 |
| JP | 2007-108724 | 4/2007 |
| JP | 2007-293303 | 11/2007 |
| JP | 2008-262190 | 10/2008 |
| JP | 2008-268939 | 11/2008 |
| JP | 2009-037046 | 2/2009 |
| JP | 2009-098666 A | 5/2009 |

\* cited by examiner

PRODUCTION METHOD OF LIGHT SCATTERING FILM, LIGHT SCATTERING FILM, POLARIZING PLATE, IMAGE DISPLAY DEVICE, AND TRANSMISSIVE/SEMI-TRANSMISSIVE LIQUID CRYSTAL DISPLAY DEVICE

This application is based on and claims priority under 35 U.S.C. §119 from Japanese Patent Application No. 2009-083792 filed Mar. 30, 2009, the entire disclosure of which is herein incorporated by reference.

BACKGROUND OF THE INVENTION

1. Field of the Invention

The present invention relates to a production method of a light scattering film, a light scattering film, a polarizing plate, an image display device, and a transmissive/semi-transmissive liquid crystal display device.

2. Description of Related Art

In recent years, liquid crystal display devices (LCD) have been used widely because they are thin, are light weight, and consume little power. Liquid crystal display devices each includes a liquid crystal cell and a polarizing plate. The polarizing plate is usually formed of a protective film and a polarizing film and is available by staining a polarizing film made of a polyvinyl alcohol film with iodine, stretching the resulting film, and then stacking a protective film on both sides thereof. In a transmissive liquid-crystal display device, the polarizing plate may be attached onto both sides of a liquid crystal cell and one or more optical compensation sheets may be disposed further. In a reflective liquid crystal display device, it is the common practice to place a reflection plate, a liquid crystal cell, one or more optical compensation sheets, and a polarizing plate in the order of mention.

Since LCD is not a light emitting type display device, it needs an area light source. As one mode of the area light source, a backlight type having, between a liquid crystal cell and an emission light source, a member having a light diffusion capacity such as diffusion sheet or prism sheet to provide a uniform area light source has been used widely and a cold cathode fluorescent lamp (CCFL) or LED is used as an emission light source thereof. Some LCDs are known to use, as an area light source thereof, a combination of a light source placed at an edge portion of a light guiding plate and a diffusion sheet or prism sheet. In these devices, in general, a linear light source or spot light source is converted into an area light source so that the area light source is made uniform by using a diffusion sheet or diffusion film (light diffusion sheet or light diffusion film).

Among members of the backlight for obtaining an area light source, a diffusion sheet is ordinarily placed between the backlight and a polarizing plate on the side thereof. By placing the diffusion sheet, it is possible to reduce uneven luminance due to a light source and achieve uniform display properties on the screen (JP-A-2000-75134) and at the same time, suppress generation of interference fringes such as moiré due to interference of an incident light with pixels in liquid crystal cells.

In recent years, however, there has been an attempt of reducing the number of members of the liquid crystal display cell or decreasing the number of fluorescent lamps utilized as a light source for lower power consumption. With a decrease in the thickness of an LCD, a distance between the light source of the backlight and the diffusion sheet narrows and therefore it becomes difficult to achieve uniform light diffusion by using a conventional diffusion film. In order to increase this distance as much as possible, the diffusion sheet having a diffusion property on the surface of the polarizing plate on the side of the backlight has been employed as a substitute.

For example, JP-A-2000-75134 proposes a light diffusion polarizing plate containing, in dispersed form, porous amorphous particles and spherical particles and having a light diffusion layer with predetermined properties and use of it enables to omit a light diffusion sheet. JP-A-2001-172403 and JP-A-2003-25504 propose a production process of a light diffusion film having a step of casting a dope containing fine particles onto a support. It discloses that this process enables preparation of a light diffusion film excellent in optical anisotropy and the like.

SUMMARY OF THE INVENTION

However, the light diffusion film described in JP-A-2000-75134, JP-A-2001-172403, and JP-A-2003-25504 may cause a reduction in front white luminance when used in an image display device because of a low total light transmittance. On the other hand, a reduction in haze, in other words, an increase in total light transmittance in order to keep front luminance may sometimes prevent suppression of deterioration (unevenness of a backlight) in uniformity of the display screen or suppression of generation of interference fringes such as moiré. Such deterioration in uniformity or generation of interference fringes is controlled only by using amorphous particles or secondary particles, which however have an uncontrollable light scattering property, or the surface shape is controlled only by factors relating to height such as Ra or Rt. Thus, these measures do not include the surface design for exact light scattering.

An object of the invention is to provide a light scattering film, a polarizing plate, and a method capable of producing the light scattering film easily at a low cost, each contributing to improvement in the display performances and thinning of an image display device such as liquid crystal display device.

Another object of the invention is to provide an image display device that has high front white luminance, capable of providing a uniform display in the screen, and can suppress interference fringes such as moiré and at the same time, can respond to a requirement for thinning.

The above-described objects can be achieved by the following constitutions.

(1) A method for producing a light scattering film, comprising:

casting onto a support a dope containing at least a thermoplastic resin and light transmitting particles to provide a casted film, and peeling and drying the casted film to prepare a light transmitting base material;

applying an coating solution containing at least a curable compound, a polymerization initiator, and a solvent onto the light transmitting base material and drying the solvent; and curing the curable compound to form a cured layer, wherein at least one surface of the light transmitting base material has an asperity shape, the light transmitting particles have an average primary particle size greater than 2.5 μm but not greater than 12 μm, the cured layer has an average thickness of 0.1 μm or greater but not greater than 10.0 μm, and the cured layer satisfies formulae (1) to (3):

$$0.05\ \mu m \leq Ra \leq 0.8\ \mu m \quad (1)$$

$$10\ \mu m \leq Sm \leq 300\ \mu m \quad (2)$$

$$1.5° \leq \theta a \leq 4.5° \quad (3)$$

wherein Ra represents an arithmetic average roughness of the cured layer, Sm represents an average peak-to-valley distance of a surface of the cured layer, and θa represents an average inclination angle of the surface of the cured layer, each based on JIS B 0601.

(2) A method for producing a light scattering film, comprising:

casting onto a support a dope containing at least a thermoplastic resin and light transmitting particles to provide a casted film, and peeling and drying the casted film to prepare a light transmitting base material;

applying an coating solution containing at least a curable compound, a polymerization initiator, and a solvent onto the light transmitting base material and drying the solvent; and curing the curable compound to form a cured layer, wherein at least one surface of the light transmitting base material has an asperity shape, the light transmitting particles have an average primary particle size greater than 2.5 µm but not greater than 12 µm, the cured layer has an average thickness of 0.1 µm or greater but not greater than 10.0 µm, and surface inclination angles of the cured layer have the following distribution:

(a) an integral value of a frequency of 0° or greater but less than 1.0° is less than 25%, (b) an integral value of a frequency of 1.0° or greater but less than 10° is 60% or greater but less than 100%, and (c) an integral value of a frequency of 10° or greater is 0% or greater but less than 25%.

(3) The method for producing a light scattering film as described above in (1) or (2), which does not comprise a take-up step between the casting of the dope and completion of the light scattering film.

(4) A light scattering film comprising:

a light transmitting base material having a thermoplastic resin as a main component and light transmitting particles having an average primary particle size greater than 2.5 µm but not greater than 12 µm; and a cured layer having an average thickness of 0.1 µm or greater but not greater than 10.0 µm, wherein the light transmitting base material has, on a side of the cured layer, a surface shape with a flat portion substantially parallel to a film forming surface and a curved raised portion derived from the light transmitting particles, and a maximum height Rt between the raised portion and the flat portion is 1 µm or greater but not greater than 15 µm.

(5) The light scattering film as described above in (4), wherein a difference ΔRa between an arithmetic average roughness of the cured layer and an arithmetic average roughness of the light transmitting base material on the side of the cured layer in accordance with JIS B 0601 is 0.05 µm or greater but not greater than 0.50 µm.

(6) The light scattering film as described above in (4) or (5), wherein a ratio ($t_{min}/t_{max}$) of a minimum thickness $t_{min}$ to a maximum thickness $t_{max}$ of the cured layer is less than 0.2.

(7) The light scattering film as described above in any of (4) to (6), wherein the light transmitting particles are substantially spherical resin particles.

(8) The light scattering film described above in any of (4) to (7), wherein an absolute value of a difference in refractive index between the light transmitting base material and the light transmitting particles is less than 0.09.

(9) The light scattering film as described above in any of (4) to (8), which has a light scattering property to give an image clarity of from 5 to 60% as measured through an optical comb having a width of 2 mm by using an image clarity measuring instrument based on JIS K 7105.

(10) The light scattering film as described above in any of (4) to (9), wherein a transmitted and scattered light profile as measured using a goniophotometer having a light acceptance angle of 2° satisfies the following formula (d):

$$0.03 \leq I(4°)/IO \leq 0.07 \tag{d}$$

wherein I(4°) represents an intensity of the transmitted light at a position inclined at 4° to a normal line of the light scattering film and IO represents a light intensity of a light source measured from the front thereof.

(11) The light scattering film as described above in any of (4) to (10), wherein an internal haze is from 0.1 to 30% and a surface haze is from 3 to 40%.

(12) A polarizing plate having a polarizing film and a protective film on at least one side of the polarizing film, the protective film being a light scattering film as described above in any of (4) to (11).

(13) An image display device having either one of the light scattering film as described above in (4) to (11) or a polarizing plate as described above in (12).

(14) A transmissive/semi-transmissive liquid crystal display device comprising: a backlight; a liquid crystal cell; and a polarizing plate as described above in (12) as a polarizing plate on the backlight side of the liquid crystal cell.

Figure 1A:
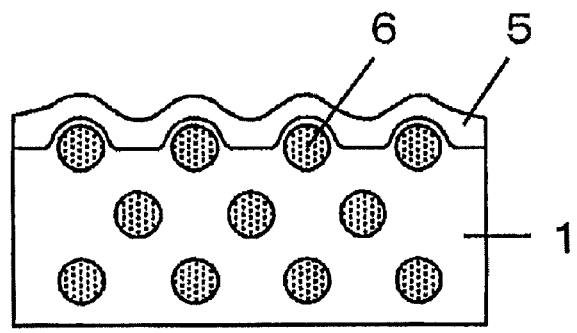
FIGS. 1A to 1C are cross-sectional views illustrating examples of a light scattering film according to an exemplary embodiment of the invention.

The reference numerals in the drawings are set forth below.

1 Light transmitting base material
2 Base layer
3 Surface layer
4 Surface layer (back layer)
5 Cured layer
6 Light transmitting material
7 Second cured layer
11 Agitator
12 Transfer pump
13 Filter
14 Stock tank
15a Transfer pump of casting solution for back layer
15b Transfer pump of casting solution for base layer
15c Transfer pump of casting solution for surface layer
16a Injection pump of additives (solvent, matt particles, etc.)
16c Injection pump of additives (solvent, light transmitting particles, etc.)
17 Casting die 18 Casting band
19 Decompression chamber
20 Casting drum
30 Casting die
32 Manifold
33 Feed block

DETAILED DESCRIPTION OF EXEMPLARY EMBODIMENTS

A light scattering film according to an exemplary embodiment of the invention causes neither reduction in front white luminance nor moiré and can provide an image display having a highly uniform luminance when used particularly as a protective film of a polarizing plate on the backlight side of a liquid crystal display device.

An exemplary embodiment of the invention will next be described, but the invention is not limited to them. In the specification, when a numerical value indicates a physical property value, a characteristic value, or the like, the term "from (numerical value 1) to (numerical value 2)" means "(numerical value 1) or greater but not greater than (numerical value 2)". The term "(meth)acrylate" as used herein means at least either one of acrylate and methacrylate. This also applies to "(meth)acrylic acid" or "(meth)acryloyl".

The invention relates to a light scattering film having a light scattering property controlled by forming a cured layer on a light transmitting base material having a specific asperity shape on a surface thereof. The light scattering film according to an exemplary embodiment of the invention has, particularly when used as a protective film for polarizing plate on the backlight side of a liquid crystal display device, a high front white luminance, can provide a uniform image in the screen of the device, can suppress occurrence of uneven interference fringes such as moiré, and can provide an image display device capable of responding to a requirement for thinning.

In a first aspect of the invention pertaining to a method for producing a light scattering film, the method for producing a light scattering film includes a step of casting, onto a support, a dope containing at least a thermoplastic resin and light transmitting particles to provide a casted film, and peeling and drying the casted film to prepare a light transmitting base material; a step of applying a coating solution at least containing a curable compound, a polymerization initiator, and a solvent to the light transmitting base material and drying the solvent, and a step of curing the curable compound to form a cured layer. At least one surface of the light transmitting base material has an asperity shape, the light transmitting particles have an average primary particle size exceeding 2.5 µm but not greater than 12 µm, the cured layer has an average thickness of from 0.1 µm or greater but not greater than 10.0 µm, and the cured layer satisfies formulae (1) to (3):

$$0.05\ \mu m \leq Ra \leq 0.8\ \mu m \quad (1)$$

$$10\ \mu m \leq Sm \leq 300\ \mu m \quad (2)$$

$$1.5° \leq \theta a \leq 4.5° \quad (3)$$

where Ra represents an arithmetic average roughness of the cured layer, Sm represents an average peak-to-valley distance of a surface of the cured layer, and θa represents an average inclination angle of the surface of the cured layer, each based on JIS B 0601.

In a second aspect of the invention, the method for producing a light scattering film comprises a step of casting, onto a support, a dope containing at least a thermoplastic resin and light transmitting particles to provide a casted film, and peeling and drying the casted film to prepare a light transmitting base material; a step of applying a coating solution at least containing a curable compound, a polymerization initiator, and a solvent to the light transmitting base material and drying the solvent, and a step of curing the curable compound to form a cured layer. At least one surface of the light transmitting base material has an asperity shape, the light transmitting particles have an average primary particle size exceeding 2.5 µm but not greater than 12 µm, the cured layer has an average thickness of 0.1 µm or greater but not greater than 10.0 µm, and the cured layer has a surface inclination angle showing the following distribution:

(a) an integral value of the frequency of the inclination angle of 0° or greater but less than 1.0° is less than 25%, (b) an integral value of the frequency of the inclination angle of 1.0° or greater but less than 10° is 60% or greater but less than 100%, and (c) an integral value of the frequency of the inclination angle of 10° or greater is 0% or greater but less than 25%.

A light scattering film according to another aspect of the invention has a cured layer having at least an average thickness of 0.1 µm or greater but not greater than 10.0 µm on a light transmitting base material containing light transmitting particles having a thermoplastic resin as a main component and having an average primary particle size greater than 2.5 µm but not greater than 12 µm. The light transmitting base material has, on the side of the cured layer, a surface shape with a flat portion which is substantially parallel to a film forming surface of the base material and a curved raised portion derived from the light transmitting particles; and a height Δh of the raised portion from the flat portion is 0.5 µm or greater but not greater than 8 µm.

Figure 8A:
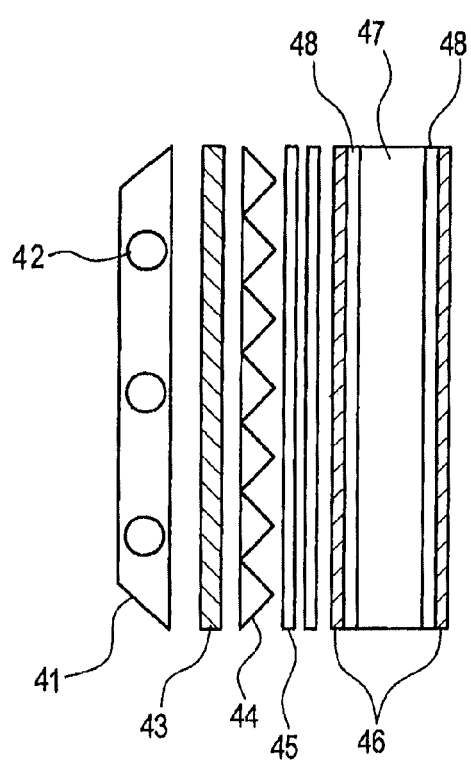
FIG. 8A is a schematic view illustrating one example of a liquid crystal display device in the background art and FIG. 8B is a schematic view illustrating one example of a liquid crystal display device according to an exemplary embodiment of the invention.

One example of a liquid crystal display device in the background art includes, as illustrated in FIG. 8A, (light source 41/optical guiding plate (fluorescent tube) 42/lower diffusion sheet 43/light collection sheet 44 (prism sheet, etc.)/upper diffusion sheet 45/liquid crystal panel (lower polarizing plate 46/substrate 48/liquid crystal cell 47/upper polarizing plate 46)) from the side of the light source. The lower diffusion sheet is an optical sheet having a strong light diffusion property and used mainly for reducing in-plane luminance unevenness of a backlight unit. The light collection sheet is an optical sheet for collecting a diffused light toward a front direction (normal line direction of the plane of the display device) of the liquid crystal display device. The upper diffusion sheet is an optical sheet used for reducing moiré generated due to a prism sheet serving as a light collection sheet or a periodic structure such as pixels in the liquid crystal cell and for reducing in-plane luminance unevenness which cannot be removed completely using the lower diffusion sheet.

Figure 8B:
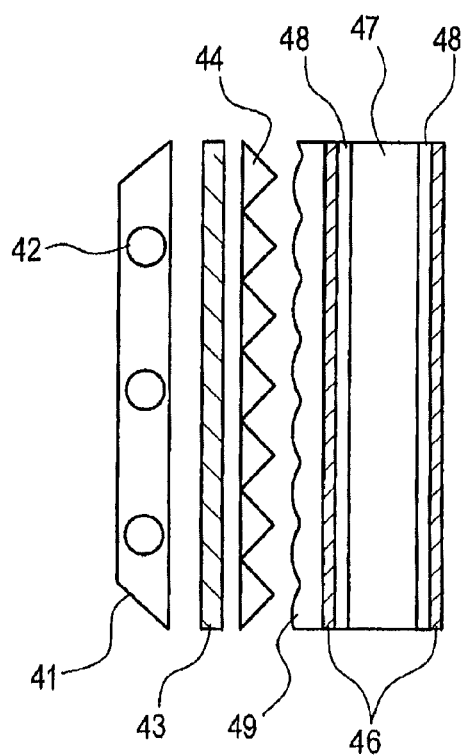

In a liquid crystal display device of the invention, as illustrated in FIG. 8B, the protective film of a lower polarizing plate (light scattering film 49), instead of the upper diffusion sheet, is imparted with a light diffusion property to help it fulfill a performance similar to that of the upper diffusion sheet. This constitution makes it possible to not only reduce moiré or in-plane luminance unevenness but also suppress reduction in front luminance or front contrast ratio which has been troubles in the upper diffusion sheet or conventional technology. Elimination of the upper diffusion sheet enables to decrease the thickness of the entire liquid crystal display device so using the protective film of a lower polarizing plate instead of the upper diffusion sheet is more effective than using a plurality of upper diffusion sheets. In principle, it is possible to decrease the thickness of the display device by the total thickness of the diffusion sheets eliminated.

More specifically, in an upper diffusion sheet or a technology in the background art, the incident light is diffused over an excessively wide angle range, whereby the amount of light outputted to the front direction shows a relative decrease. In a constitution of the invention, that is, a liquid crystal display device obtained by optimizing the light diffusion profile of a light diffusive protective film of the lower polarizing plate, a diffusion property necessary and sufficient for reducing moiré or luminance unevenness is imparted without reducing the amount of a light outputted to the front direction so that this problem can be overcome. Although the optimum light-scattering profile of an optical film having a light diffusion property and to be used in the invention may change when the properties of a backlight or lower diffusion sheet are changed or these members are used as a composite, the optical film can basically exhibit intended performances if it has a constitution within the above-described range.

Furthermore, some liquid crystal display devices use a luminance improved film (for example, "DBEF", trade name; product of 3M) just below the lower polarizing plate. When a light scattering film is placed as a protective film of the lower polarizing plate, depolarization may occur and cause reduction in a luminance improving performance. A liquid crystal display device of the invention, however, uses an optical film undergoing large depolarization and having a small amount of a wide-angle scattering component so that reduction in the luminance improving performance can be made as small as possible.

<Surface Shape of Light Scattering Film>

A light scattering film of the invention will hereinafter be described.

A light scattering film of the invention includes a light transmitting base material having, on at least one of the surfaces thereof, an asperity shape (an inclined surface) and containing light transmitting particles having an average primary particle size exceeding 2.5 μm but not greater than 12 μm and on at least a cured layer placed on the light transmitting base material; and has a light scattering performance. In the description hereinafter, the surface on the side of the cured layer whose asperity shape has been controlled for controlling the light scattering property is defined as Surface A, while another surface is defined as Surface B. First, the shape of the surface A will hereinafter be described.

It is necessary to control the inclination angle of the surface of the light scattering film of the invention in order that the film has a front scattering property. When the surface shape of the cured layer is expressed by roughness parameters as specified in JIS B 0601, they should satisfy the following formulae 1 to 3:

$$0.05\ \mu m \leq Ra \leq 0.8\ \mu m \quad (1)$$

$$10\ \mu m \leq Sm \leq 300\ \mu m \quad (2)$$

$$1.5° \leq \theta a \leq 4.5° \quad (3)$$

A preferable range is:

$$0.1\ \mu m \leq Ra \leq 0.6\ \mu m \quad (1')$$

$$50\ \mu m \leq Sm \leq 200\ \mu m \quad (2')$$

$$1.8° \leq \theta a \leq 4.2° \quad (3')$$

A more preferable range is:

$$0.1\ \mu m \leq Ra \leq 0.5\ \mu m \quad (1'')$$

$$80\ \mu m \leq Sm \leq 150\ \mu m \quad (2'')$$

$$2.0° \leq \theta a \leq 4.0° \quad (3'')$$

These roughness parameters can be measured using an instrument in accordance with JIS-B0601 (1994, 2001), for example, "SURFCORDER MODEL SE-3500", trade name; product of Kosaka Laboratory.

When the Ra is less than 0.05 μm, the film cannot have a sufficient scattering effect. When it exceeds 0.8 μm, on the other hand, light unnecessarily scatters over a wide angle and causes reduction in front luminance. When Sm exceeds 300 μm, a distance between a peak and a valley becomes too wide, making it difficult to improve the uniformity of a backlight or to remove moiré. When the light scattering film of the invention is prepared by imparting an asperity to the surface of the light transmitting base material with light transmitting particles having a primary particle size exceeding 2.5 μm but not greater than 12 μm, it is difficult to obtain a surface shape having Sm less than 10 μm. When Sm is less than 10 μm, $\theta a$ shows a relative increase and exceeds 4.5°, making it difficult to obtain an intended surface shape. In addition, when Sm is less than 10 μm, it becomes difficult to satisfy $\theta a$ of 4.5° or less, making it difficult to obtain an intended surface shape. In order to prevent moiré of the liquid crystal device, it is preferred to control Sm to not greater than the pitch of the prism sheet on the backlight side or twice or less of the pixel pitch of the liquid crystal cell. When $\theta a$ is smaller than 1.5°, light components advancing in a straight direction increases excessively, preventing to obtain a scattering effect, while $\theta a$ exceeding 4.5° increases unnecessary wide-angle scattering components, causing a reduction in front luminance.

Next, the surface shape of Surface A, when expressed in another way, that is, expressed by an inclination angle and its percentage, is determined by the following method.

Supposing that apexes of a triangle having an area of from $0.5\ \mu m^2$ to $2\ \mu m^2$ are located on a transparent support, normal lines are extended vertically upward from these three apexes (three normal lines on the support). A triangle is then formed with three points where these three normal lines on the support intersect with the film surface (Surface A). An angle formed between the normal line of the plane of the triangle formed in the above manner and the normal line extended from the support vertically upward is defined as an inclination angle.

How to determine the percentage of the inclination angle will next be described. An area of 250000 μm² (0.25 mm²) or greater of the support is divided into the above-described triangles and the inclination angle of all the triangles is measured. The inclination angle at respective measuring points is determined and a percentage of the number (frequency) of the inclination angles relative to the number of all the measuring points is determined. This percentage is determined as the frequency of an inclination angle. In the invention, integral values of the frequency of an inclination angle within a range of 0° or greater but less than 1.0°, 1.0° or greater but less than 10.0°, and 10.0° or greater are determined. The measurement may be performed in detail in accordance with the method described in paragraph 12, page 6 of JP-A-2007-108724.

In the invention, the measurement area on the support is preferably 250000 μm² (0.25 m²) or greater, and is preferably 0.25 mm² or greater but not greater than 1.0 mm² from the standpoint of satisfying both the measurement accuracy and measurement efficiency. The area of the triangle as a measurement unit is preferably from 0.5 mm² to 2 mm² in order to guarantee the measurement accuracy.

Of some measurement instruments put on the market, "SXM 520-AS150" (trade name; product of Micromap/USA) is used in the invention. This apparatus incorporates a halogen lamp, which is equipped with an interference filter having a center wavelength of 560 nm, inserted therein as a light source and an objective lens of from 2.5× to 50× magnification. Data are collected through a ⅔ inch CCD, a standard equipment, having a pixel count of 640×480. In the invention, an objective lens, the measurement unit, and the measurement area are set at 10× magnification, 0.8 µm², and 500000 µm² (0.5 mm²), respectively. If desired, the magnification of the objective lens is increased while the measurement unit and measurement area may be decreased accordingly. The measurement data are analyzed using a software such as "MAT-LAB" (trade name; product of Math Works, Inc./USA) to calculate the inclination angle distribution. In the invention, the inclination angle is measured in increments of about 0.01°.

In the invention, the inclination angle of Surface A which is the surface of the light scattering film on the side of the cured layer should have the following distribution:

(a) an integral value of the frequency of 0° or greater but less than 1.0° is less than 25%, (b) an integral value of the frequency of 1.0° or greater but less than 10° is 60% or greater but less than 100%, and (c) an integral value of the frequency of 10° or greater is 0% or greater but less than 25%.

The inclination angle has preferably the following distribution:

(a) an integral value of the frequency of 0° or greater but less than 1.0 is 2% or greater but not greater than 20%, (b) an integral value of the frequency of 1.0° or greater but less than 10° is 60% or greater but not greater than 95%, and (c) an integral value of the frequency of 10° or greater is 1% or greater but not greater than 20%.

The inclination angle has more preferably the following distribution:

(a) an integral value of the frequency of 0° or greater but less than 1.0 is 3% or greater but not greater than 15%, (b) an integral value of the frequency of 1.0° or greater but less than 10° is 65% or greater but not greater than 90%, and (c) an integral value of the frequency of 10° or greater is 1% or greater but less than 16%.

When the integral value of the frequency of the inclination angle of 0° or greater but less than 1.0° is 25% or greater, a sufficient scattering property cannot be achieved because the percentage of a flat surface becomes too large. When the integral value of the frequency of 1.0° or greater but less than 10° is less than 60%, a scattering component having a less influence on the reduction of front contrast ratio and having an adequate scattering angle decreases. When the integral value of the frequency of 10° or greater becomes 25% or greater, the scattering component on the wide angle side increases excessively, causing a reduction in front contrast ratio.

In the invention, it is particularly preferred to satisfy the following inclination angle distribution in addition to the above-described requirement in order to give an adequate scattering property while suppressing a reduction in front contrast ratio.

(d) the integral value of the frequency of 0° or greater but less than 0.5° is less than 9%, and (e) the integral value of the frequency of 3° or greater but less than 8.0° is 25% or greater but not greater than 60%.

The following is a further preferable inclination angle distribution:

(d) the integral value of the frequency of 0° or greater but less than 0.5° is 1% or greater but not greater than 8%, and (e) the integral value of the frequency of 3° or greater but less than 8.0° is 30% or greater but not greater than 55%.

<Surface Shape of Light Transmitting Base Material>

Figure 1B:
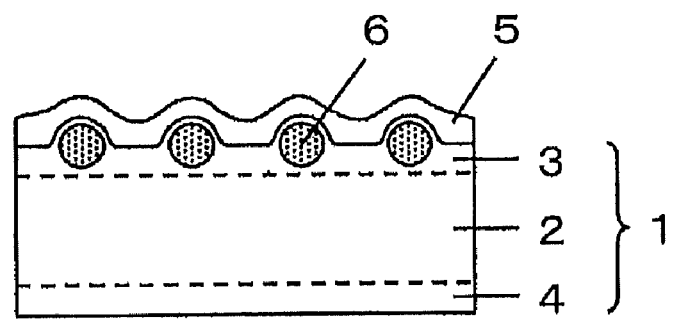
Figure 1C:
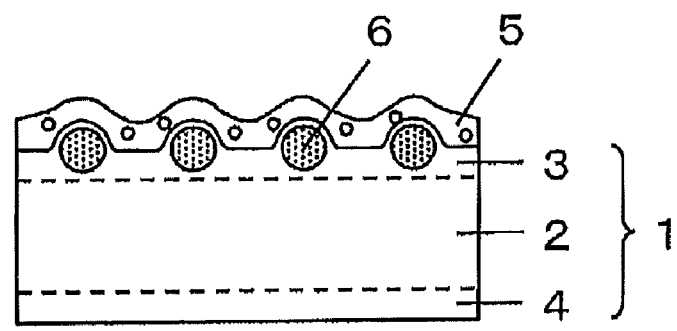

The surface shape of the light scattering film of the invention is controlled within the above-described range by applying a curable compound onto the light transmitting base material having an asperity surface. The surface shape of the light transmitting base material needs sufficient control. More specifically, the base material has, as illustrated in FIGS. 1A to 1C, a flat portion which is substantially parallel to the film forming surface of the base material and a curved raised portion derived from light transmitting particles. The term "film forming surface" means a surface including a film forming direction at the time of film formation. The maximum height Rt, as specified in JIS B 0601, between the raised portion and the flat portion should be 1 µm or greater but not greater than 15 µm, is preferably from 1.5 µm to 12 µm, more preferably from 2 µm to 10 µm.

On the other hand, a difference in height between the raised portion and the flat portion is preferably from 0.5 µm to 8 µm, more preferably from 1 µm to 6 µm. When the height difference is 0.5 µm or greater, the surface shape can be controlled sufficiently with the cured layer. When it is 8 µm or less, the surface shape necessary in the invention can be obtained even if the thickness of the cured layer is increased.

The height difference can be measured by observing, through a scanning electron microscope, a cross-section obtained by cutting the light transmitting base material along the apex of the raised portion.

It is desired that the light transmitting base material in the invention has a surface shape along which the shape of the light transmitting particles appears as is and drying of a solution (dope) containing the light transmitting particles is performed without leveling. This means that the higher the viscosity of the dope, the better. The viscosity is preferably 1000 cP or greater, more preferably 5000 or greater. Such a high-viscosity solution however cannot be applied when the conventional method such as method of application is employed. It has been found in the invention that this difficulty can be overcome by casting a solution of a thermoplastic resin (dope of a polymer solution having, for example, a viscosity of 10000 cP).

<Formation of Low-Inclination-Angle Distribution Surface with a Cured Layer>

As regards the control of the surface inclination angle distribution in the invention, it is important to form a surface having unevenness within a certain range on the surface of the light transmitting base material as described above and then smoothing the surface with the cured layer. The following control is necessary for it.

A desired surface shape can be obtained by adjusting the thickness of the cured layer to preferably from 0.1 µm to 10 µm, more preferably from 0.2 µm to 5 µm, most preferably from 0.5 µm or greater but less than 3 µm in connection with the height difference Δh. When the thickness is less than 0.1 µm, adequate adjustment of the surface shape cannot be achieved and the cured layer cannot be imparted with a hard coating property. When the thickness exceeds 10 µm, the surface of the cured layer becomes too flat and the intended surface shape cannot be obtained.

A difference (ΔRa=Ra,b−Ra,c) between an arithmetic average roughness (Ra,b) of the light transmitting base material and an arithmetic average roughness (Ra,c) of the cured layer is preferably from 0.05 µm to 0.50 µm, more preferably from 0.10 µm to 0.45 µm. The ΔRa of 0.05 µm or greater enables sufficient surface control and when the light scattering film of the invention having such a property is used for a liquid crystal display device or the like, more can be overcome sufficiently. The ΔRa exceeding 0.5 µm makes it impossible to form the intended surface shape.

A film thickness ratio ($t_{min}/t_{max}$), that is, a ratio of the minimum thickness $t_{min}$ (the thickness often on the apex of the light transmitting particle in the light transmitting base material) of the cured layer to the maximum thickness (often the thickness of the cured layer on the flat portion of the light transmitting base material) is preferably less than 0.2 because it enables effective leveling and formation of the intended surface shape. The thickness ratio is more preferably less than 0.15.

A cured-layer forming coating solution obtained by dissolving a curable compound and a polymerization initiator in a solvent is desirably leveled adequately during drying/film formation. Described specifically, the coating solution is preferably adjusted to have a viscosity of from about 1 cP to 100 cP; the viscosity of the solid content in the coating solution is preferably 10 cP or greater; and accordingly, the concentration of the coating solution is preferably from 0.5 mass % to several tens mass %, though depending on the solvent. When the coating solution has a viscosity of 1 cP or greater or the solid content has a viscosity of 10 cP or greater, the intended surface shape can be obtained by adequate leveling and moiré can be removed easily. When the viscosity of the coating solution is 100 cP or less, leveling can be performed efficiently, facilitating the formation of the intended surface shape.

The coating solution for forming a cured layer may further contain other surface-controlling particles, conductive inorganic fine particles, conductive polymers, fluorine- or silicone-based antifouling materials, and the like insofar as the intended surface shape can be maintained.

Further, it is possible to stack, on the cured layer, a conductive inorganic-fine-particle containing layer, a conductive polymer layer, a fluorine- or silicone-based antifouling layer, a low refractive index layer, or an antireflection layer simultaneously with or subsequent to the formation of the cured layer.

In a production method of the light scattering film of the invention, continual production may be performed, more specifically, a step of preparing a light transmitting base material and a step of forming a cured layer may be performed successively without inserting a take-up step between casting and formation of the light scattering film. In such a case, a residual solvent amount of the dope for a light transmitting base material is preferably from 2 mass % to 50 mass % when the coating solution for forming the cured layer is applied. The residual solvent amount of 2 mass % or greater can provide good adhesion irrespective of the kind of the solvent of the coating solution. The residual solvent amount of 50 mass % or less facilitates handling with a roller and control of the surface shape of the light scattering film within the intended range because the solvent of the coating solution does not excessively penetrate into the dope for a light transmitting base material.

In the invention, it is preferred not to insert a take-up step between the formation of the light transmitting base material and preparation of the light scattering film from the standpoint of improvement in production efficiency and cost.

No particular limitation is imposed on the form of Surface B of the light scattering film. In order to impart adhesion with a polarizing plate during preparation thereof and reduce the influence on light scattering characteristics derived from the surface concavo-convex shape which is the above-described feature of the invention, Surface B is preferably flat. The arithmetic average roughness (Ra) of Surface B is preferably from 0.001 µm to 0.10 µm, more preferably from 0.001 µm to 0.05 µm, most preferably from 0.001 µm to 0.03 µm.

<Optical Properties of Light Scattering Film>

In consideration of the intensity of an output light (intensity of an output light relative to the intensity of an incident light) passing through a light scattering film when a light is incident from a normal direction of the light scattering film, supposing that an intensity of light of a substantially parallel light source is measured from the front is IO, a ratio I(0°)/IO, that is, a ratio of an intensity I(0°) of an output light in the normal direction of the light scattering film of the invention to IO is preferably from 0.40 to 0.98, more preferably from 0.45 to 0.80, most preferably from 0.50 to 0.70. The ratios of from 0.40 to 0.98 are preferred because reduction in white luminance during white color development is small and darkening of a display screen does not occur.

It has been found that in order to suppress both moiré and uneven in-plane luminance while keeping a front white luminance and front contrast ratio, a light scattering film having a greater light scattering intensity ratio toward the low angle side (having a greater front scattering property) is preferred and a film having a relatively large scattered light intensity to an angle in the vicinity of 2° to 6° relative to a straight light incident from the normal line of the film compared with a scattered light to another angle is preferred. More specifically, in the light scattering film of the invention, a ratio I(4°)/IO wherein I(4°) means an intensity of an output light at a position inclined at 4° from the normal direction of the surface of the light scattering film is preferably from 0.03 to 0.07, more preferably from 0.03 to 0.065, most preferably from 0.035 to 0.06. When the ratio I(4°)/IO is from 0.03 to 0.07, a reduction in contrast ratio is small and generation of moiré can be suppressed. The ratios of 0.03 or greater improve the moiré reducing capacity, while those not greater than 0.07 suppress a reduction in front contrast ratio. The profile of a transmitted and scattered light is measured using a goniophotometer set at an acceptance angle of 2°.

An internal haze (obtained by subtracting a surface haze from a total haze) derived from the inside of the light scattering film is preferably from 0.1% to 30%, more preferably from 0.5% to 25%, most preferably from 1% to 20%. When the internal haze falls within the above range, it is possible to make it difficult to see patterns of a liquid crystal panel, color unevenness or luminance unevenness due to surface scattering caused by the concave-convex surface as well as adequate internal scattering.

The surface of the light transmitting base material is desirably a little roughened prior to the formation of the cured layer by application. The total haze is preferably 10% or greater, more preferably 15% or greater, still more preferably 30% or greater.

The surface haze of the light scattering film due to the surface thereof is preferably from 3% to 40%, more preferably from 5% to 35%, most preferably from 8% to 30%.

The image clarity of the light scattering film measured through a 2-mm wide optical comb by using an image clarity measuring instrument as defined by JIS K 7105 is preferably from 5 to 60%, more preferably from 10% to 60%, most preferably from 10% to 55%. The image clarity within this range does not cause a large reduction in front contrast ratio and at the same time, makes it difficult to see patterns of a liquid crystal panel, color unevenness, luminance unevenness, moiré, and the like.

<Light Transmitting Particles>

The light transmitting fine particles contained in the light transmitting base material in the invention are preferably substantially spherical. The light transmitting fine particles may be distributed entirely in the thickness direction of the light transmitting base material, but are preferably eccentrically located in the vicinity of the surface of the light transmitting base material. The light transmitting particles have an average primary particle size greater than 2.5 μm but not greater than 12 μm. The particles within this range facilitate formation of raised portions and in addition, facilitate forward scattering while suppressing wide-angle scattering when internal scattering is performed. The average primary particle size is more preferably greater than 3.5 μm but not greater than 10 μm, most preferably greater than 5 μm but not greater than 9 μm. When the average primary particle size is not greater than 2.5 μm, a raised portion cannot be formed easily and light scatters even to an unnecessary wide angle. When the average primary particle size exceeds 10 μm, on the other hand, surface control with the cured layer becomes difficult. The light transmitting particles have a refractive index of preferably from 1.40 to 1.65, more preferably from 1.45 to 1.60, most preferably from 1.45 to 1.55.

An absolute value of a difference in refractive index between the light transmitting particles and the light transmitting base material is preferably less than 0.09, more preferably 0.07 or less, still more preferably 0.05 or less. When it is less than 0.09, the scattering angle at the interface of the light transmitting particles does not become too large and a wide-angle scattering component does not increase. In addition, within the above range, the internal scattering and surface scattering can be combined to achieve adequate forward-scattering optical properties.

The using amount of the light transmitting particles is preferably from 0.1 g/m$^2$ to 5.0 g/m$^2$, more preferably from 0.2 g/m$^2$ to 3.0 g/m$^2$, most preferably from 0.3 g/m$^2$ to 2.0 g/m$^2$, each per unit area. A desired surface shape can be obtained by controlling the using amount to fall within the above range.

As the light transmitting particles, inorganic particles and organic particles can be used. Examples of the inorganic particles include silica and alumina. They are, for example, spherical silica and spherical alumina manufactured by Micron Co.

Examples of the organic particles include poly(methyl methacrylate) acrylate resin, acrylic styrene resin, poly(methyl methacrylate) resin, silicon resin, polystyrene resin, polycarbonate resin, benzoguanamine resin, melamine resin, polyolefin resin, polyester resin, polyamide resin, polyimide resin, and poly(ethylene fluoride) resin.

Commercially available products of the styrene resin or acrylic resin include "Chemisnow MX Series" and "Chemisnow SX Series" (each, trade name; product of Soken Chemical & Engineering) and "Techpolymer" (trade name; product of Sekisui Plastics); those of the benzoguanamine resin include "Epostar" (trade name; product of Nippon Shokubai); and those of the melamine resin include "Optbeads" (trade name; product of Nissan Chemical).

From the standpoint of adhesion with the thermoplastic resin in the light transmitting base material or from the standpoint of interfacial peeling or dropping of the particles due to humidity or heat, the organic particles not so different in expansion coefficient from the thermoplastic resin are preferably used. In the invention, the light transmitting particles are particularly preferably substantially spherical resin particles.

<Material of Light Transmitting Base Material>

Materials of the light transmitting base material according to the invention will next be described. A main component (material constituting 51 mass % or greater but not greater than 99 mass % of the solid content of the light transmitting base material) constituting the light transmitting base material of the invention is preferably a thermoplastic resin. Specific examples include a cellulose acylate (e.g., triacetyl cellulose, diacetyl cellulose, propionyl cellulose, butyryl cellulose, acetylpropionyl cellulose, and nitrocellulose), polyamide, polycarbonate, a polyester (e.g., polyethylene terephthalate, polyethylene naphthalate, poly-1,4-cyclohexanedimethylene terephthalate, polyethylene-1,2-diphenoxyethane-4,4'-dicarboxylate, and polybutylene terephthalate), a polystyrene (e.g., syndiotactic polystyrene), a polyolefin (e.g., polypropylene, polyethylene, polymethylpentene, and polycycloalkane), polysulfone, polyethersulfone, polyallylate, polyetherimide, poly(methyl methacrylate), polyether ketone, a norbornene resin ("ARTON", trade name, product of JSR), amorphous polyolefin ("ZEONEX", trade name, product of Zeon Corp.), and a (meth)acrylic resin ("ACRYPET" VRL20A, trade name; product of Mitsubishi Rayon, cyclic-structure-containing acrylic resins described in JP-A-2004-70296 and JP-A-2006-171464). Of these, triacetyl cellulose, diacetyl cellulose, propionyl cellulose, polyethylene terephthalate, and polyethylene naphthalate are particularly preferred.

For the transparent protective film to be preferably used for the polarizing plate, the hydrophobicity/hydrophilicity balance of a film, a bonding property with a vinyl alcohol film of the polarizing film, and uniform optical properties in the entire plane of the film are important. In particular, fatty acid esters of cellulose (cellulose acylates) are particularly preferred, with triacetyl cellulose, diacetyl cellulose, and propionyl cellulose being more preferred.

Figure 6A:
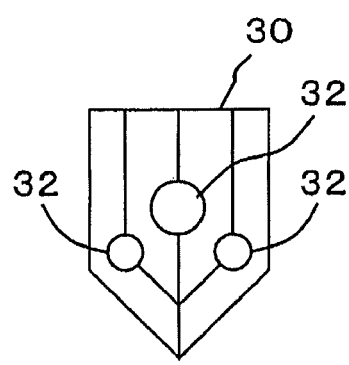
FIG. 6A is a view illustrating a multi-manifold type co-casting die and FIG. 6B is a view illustrating a feed-block type co-casting dye.
Figure 6B:
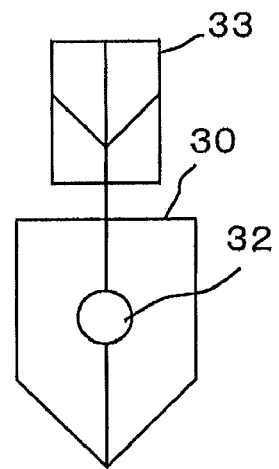
Figure 7:
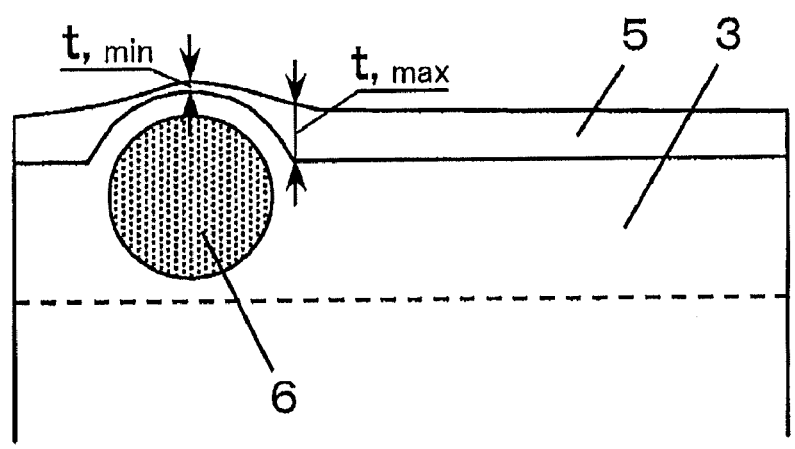
FIG. 7 is a schematic view illustrating the minimum and maximum film thicknesses of a cured layer.

In producing the light transmitting base material of the invention for use in the invention, a stacking and casting method such as co-casting (simultaneous multilayer casting) and sequential casting can be used. When co-casting or sequential casting is employed, a plurality of dopes are prepared first. The co-casting method is a casting method where dopes are extruded onto a casting support (band or drum) from a casting geeser (casting die) capable of simultaneously extruding a plurality of dopes (for three or more layers) from respective slits or the like, dried adequately, separated from the support, and then dried to form a light transmitting base material. As the casting die, either a multi-manifold type illustrated in FIG. 6A or a feed block type illustrated in FIG. 6B may be used. An apparatus equipped with a pressure reduction chamber at a dope protrusion portion thereof is preferred.

The sequential casting method is a casting method conducted in the following manner. A first casting dope is extruded and cast onto a casting support from a casting geeser; after drying or not drying the dope, a second casting dope is cast and extruded onto the first dope from the casting geeser; third and subsequent dopes are sequentially cast and stacked in the same manner; and the stack is separated from the support at an appropriate time and dried to form a light transmitting base film. During from drying to application, the base material may be stretched in a certain direction. Described specifically, it may be stretched, for example, by from 0.9 to 1.5 times in the lengthwise and/or width direction.

The light transmitting base material may be formed by a melt extruding film formation method. In this method, the above-described thermoplastic resin and light transmitting particles are mixed and dissolved, followed by melt extruding and stretching to prepare a light transmitting base material. In the invention, biaxial stretching at a draw ratio of from 1.0 to 2.0 in a certain direction and a draw ratio of from 1.5 to 7.0 in a direction perpendicular thereto is preferred. It is more preferred that the draw ratio in a certain direction is 1.1 to 1.8, while that in a direction perpendicular thereto is from 3.0 to 5.0. Controlling the draw ratio to fall within this range facilitates formation of light transmitting particles in the form protruding from the plane of the light transmitting base material.

As described above, any of these co-casting method, sequential casting method, and melt extruding film formation method may be used for the production of the light transmitting base material. However, in general, the sequential casting method involves a complicated step and has difficulty in maintaining the planarity of the film, whereas the co-casting method is preferred because of a simple step and high productivity. When the melt extrusion film formation is employed, some of the base materials formed by this method may cause foreign-matter disorders due to partially poor dissolution.

In the co-casting method, the dope containing the light transmitting particles preferably constitutes the uppermost layer of the light transmitting base material (refer to FIG. 1B). More specifically, during casting, the dope is preferably placed on the surface of the support or on the air interface side, more preferably placed on the air interface side from the standpoint of a peeling property. It is preferred that in order to prevent leveling at the initial stage of casting, the temperature of the support is adjusted to 20° C. or less. It is also preferred to adjust the temperature of the support to 0° C. or less after casting in order to cause gelation by cooling.

Regions different in the amount of the light transmitting particles in a depth direction of the light transmitting base material are preferably formed in the light transmitting base material. A region rich in the amount of the light transmitting particles is preferably present in the side of Surface A of the light transmitting base material. More specifically, the region is more preferably present in the light transmitting base material from Surface A to 90% of the total depth, still more preferably present in the light transmitting base material from Surface A to 75% of the total depth, most preferably present in the light transmitting base material from Surface A to 50% of the total depth. It is also possible that the light transmitting base material does not contain the particles in a region from Surface A to 25% of the depth. The surface shape of the invention can be obtained by causing the light transmitting particles to exist within these ranges. The light transmitting base material having light transmitting particles segregated in a predetermined depth direction can be formed, for example, by casting a plurality of dopes different in particle content simultaneously or sequentially or co-extruding a plurality of dissolved resins different in particle content. Thermoplastic resins used for the layers may be different from each other insofar as they do not cause peeling. For example, dopes different in the substituent or substitution amount of a cellulose acylate may be stacked one after another.

Figure 2A:
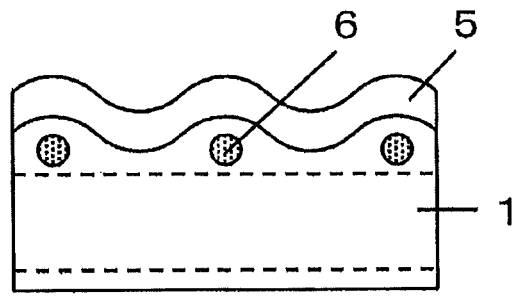
FIGS. 2A and 2B are cross-sectional views illustrating example of a light scattering film in the background art.
Figure 2B:
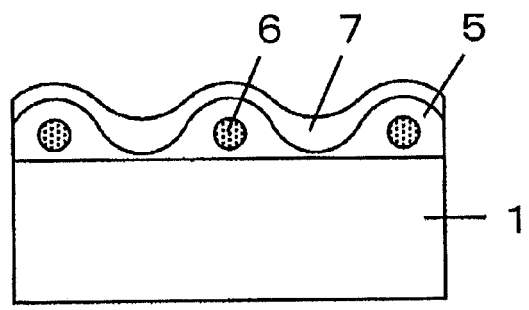

The light transmitting base material has a film thickness of preferably from 20 μm to 200 μm, more preferably from 20 μm to 80 μm, most preferably from 25 μm to 50 μm. When the light transmitting base material is formed using a plurality of dopes in co-casting, a thickness ratio of a surface-layer dope (total thickness when the material has a surface layer on both sides thereof) to a base-layer dope {(thickness of surface-layer dope)/(thickness of base-layer dope)×100} is preferably from 0.25% to 50%, more preferably from 0.6% to 40%. Thickness ratios of 0.25% or greater facilitate formation of a uniform layer. Thickness ratios not greater than 50% stabilize the interface of the dopes and hardly damage the surface shape. The term "thickness of a dope" as used herein means a thickness of a dope after evaporation of a solvent therefrom. The terms "surface-layer dope" and "base-layer dope" express a state in which dopes of a thermoplastic resin dissolved in a solvent are cast from a casting die and constitute a surface layer and a base layer which are adjacent to each other. They do not always indicate the presence of an interface in the light transmitting base material after evaporation of the solvent. In FIGS. 1 and 2, the boundary between the dopes is therefore indicated with a broken line.

The material preferably used as a material of the light transmitting base material in the invention is a cellulose acylate, with carboxylate esters of cellulose having carbon atoms in total of from 2 to 22 being particularly preferred. Examples include alkyl carbonyl esters, alkenyl carbonyl esters, cycloalkyl carbonyl esters, aromatic carbonyl esters, and aromatic alkylcarbonyl esters of cellulose. They may have a substituted group further.

The acyl group having 2 to 22 carbon atoms in the cellulose acylate to be used in the invention is not particularly limited and it may be either an aliphatic acyl group or an aromatic acyl group. Preferred example of the acyl group include acetyl, propionyl, butanoyl, heptanoyl, hexanoyl, octanoyl, cyclohexanecarbonyl, adamantanecarbonyl, phenylacetyl, benzoyl, naphthylcarbonyl, (meth)acryloyl, and cinnamoyl. Among these acyl groups, more preferred are acetyl, propionyl, butanoyl, pentanoyl, hexanoyl, cyclohexanecarbonyl, phenylacetyl, benzoyl, and naphthylcarbonyl.

The cellulose acylate suited for use in the invention is preferably a cellulose acylate in which the degree of substitution to the hydroxyl group of cellulose satisfies the following formulae (7) and (8):

$$2.3 \leq SA' + SB' \leq 3.0 \qquad \text{Formula (7)}$$

$$0 \leq SA' \leq 3.0 \qquad \text{Formula (8)}$$

In the formulae, SA' represents a degree of substitution with acetyl groups for the hydrogen atoms on the hydroxyl groups in the cellulose and SB' represents a degree of substitution with an acyl group having 3 to 22 carbon atoms for the hydrogen atoms on the hydroxyl groups in the cellulose. Incidentally, SA represents acetyl groups substituted for the hydrogen atoms on the hydroxyl groups in the cellulose and SB represents acyl groups having 3 to 22 carbon atoms and substituted for the hydrogen atoms on the hydroxyl groups in the cellulose.

The β-1,4-bonded glucose unit constituting the cellulose has a free hydroxyl group at the 2-position, 3-position, and 6-position. The cellulose acylate is obtained by esterification of some or all of these hydroxyl groups with acyl groups. A term "degree of substitution with acyl groups" means an esterification degree of the hydroxyl groups at each of the 2-position, 3-position, and 6-position (100% esterification at respective positions corresponds to a degree of substitution of 1). In the invention, the total (SA'+SB') of the degrees of substitution of SA and SB is preferably from 2.6 to 3.0, more preferably from 2.70 to 3.00. The degree of substitution of SA (SA') is preferably from 1.4 to 3.0, especially preferably from 2.3 to 2.9.

In the invention, the number of carbon atoms of the acyl groups with which the hydrogen atoms on the hydroxyl groups of the cellulose have been substituted (SB) is preferably 3 or 4. The degree of substitution with acyl groups having such a number of carbon atoms preferably satisfies the following formula (9) in addition to the above formulae (7) and (8).

$$0 \leq SB'' \leq 1.2 \qquad \text{Formula (9)}$$

wherein, SB" represents an acyl group having 3 or 4 carbon atoms with which the hydrogen atoms on the hydroxyl groups of the cellulose have been substituted.

The degree of substitution may be determined by calculation based on the measurement of the degree of bond of a fatty acid to the hydroxyl groups in the cellulose. The measurement may be performed in accordance with ASTM D-817-91 and ASTM D-817-96. Also, the substitution state of the acyl groups to the hydroxyl groups is measured by the $^{13}$C NMR method.

The cellulose acylate film is preferably composed substantially of, as polymer components constituting it, a cellulose acylate satisfying the formulae (7) and (8). The term "substantially" means 55 mass % or greater (preferably 70 mass % or greater, more preferably 80 mass % or greater) of all the polymer components. These cellulose acylates may be used either singly or in combination.

The degree of polymerization of the cellulose acylate preferably used in the invention is, in terms of a degree of viscosity average polymerization, from 200 to 700, preferably from 230 to 550, more preferably from 230 to 350, especially preferably from 240 to 320. The average degree of polymerization can be measured using the limiting viscosity method of Uda, et al, (Kazuo Uda and Hideo Saito, JOURNAL OF THE SOCIETY OF FIBER SCIENCE AND TECHNOLOGY, JAPAN, Vol. 18, No. 1, pp. 105-120 (1962)). Furthermore, this method is described in detail in JP-A-95538/1997.

The number average molecular weight Mn of the cellulose acylate is preferably from $7\times10^4$ to $25\times10^4$, more preferably from $8\times10^4$ to $15\times10^4$. The ratio Mw/Mn of the mass average molecular weight Mw of the cellulose acylate to Mn is preferably from 1.0 to 5.0, more preferably from 1.0 to 3.0. The average molecular weight and molecular weight distribution of the cellulose acylate can be measured using high-performance liquid chromatography. From the measurement results, Mn and Mw are determined and the Mw/Mn ratio can be calculated.

(Plasticizer)

In the invention, a plasticizer may be used for imparting flexibility to the light transmitting base material and enhancing the dimensional stability and moisture resistance.

When the cellulose acrylate is used as a material of the light transmitting base material, plasticizers having an octanol-water distribution coefficient (log P value) from 0 to 10 are particularly preferred. A compound having a log P value of 10 or less shows good compatibility with the cellulose acylate, thus tending to suppress film troubles such as clouding and dusting. On the other hand, a compound having a log P value of 0 or greater doesn't exhibit too high hydrophilicity and thus cannot deteriorate the water resistance of the cellulose acylate film. It is therefore preferred to use the cellulose acrylate within the above-described range. The log P value is more preferably within a range of from 1 to 8, especially preferably from 2 to 7.

For the measurement of an octanol/water distribution coefficient (log P value), the flask shaking method described in JIS Z7260-107 (2000) can be employed. The octanol/water distribution coefficient (log P value) can be estimated by a computational chemistry or empirical method instead of a measured value. Preferred examples of the computational chemistry include Crippen's fragmentation method (J. Chem. Inf. Comput. Sci, 27, p. 21 (1987).), Viswanadhan's fragmentation method (J. Chem. Inf. Comput. SCi, 29, p. 163 (1989).), and Broto's fragmentation method (Eur. J. Med. Chem.-Chim. Theor, 19, p. 71 (1984).). Of these, Crippen's fragmentation method (J. Chem. Inf. Comput. ScL, 27, p. 21 (1987).) is more preferred. Whether or not a compound falls within the scope of the invention when the log P value of a certain compound differs by the measuring method or computational method is preferably judged by Crippen's fragmentation method.

Examples of the plasticizer preferably added include low-molecular to oligomer compounds having physical properties within the above described range and having a molecular weight of from about 190 to 5000. Examples include phosphoric acid esters, carboxylic acid esters, and polyol esters.

Examples of the phosphoric acid esters include triphenyl phosphate (TPP), tricresyl phosphate, cresyl diphenyl phosphate, octyl diphenyl phosphate, diphenyl-biphenyl phosphate, trioctyl phosphate, and tributyl phosphate.

Representative examples of the carboxylic acid esters include phthalic acid esters and citric acid esters. Examples of the phthalic acid esters include dimethyl phthalate, diethyl phthalate, dibutyl phthalate, dioctyl phthalate, diphenyl phthalate, and diethylhexyl phthalate. Examples of the citric acid esters include o-acetyl triethyl citrate, o-acetyl tributyl citrate, acetyl triethyl citrate, and acetyl tributyl citrate.

These preferred plasticizers are in liquid form at 25° C. except for TPP (melting temperature: about 50° C.) and have a boiling point of 250° C. or greater.

These plasticizers may be used either singly or in combination. The plasticizer(s) may be added in an amount of from 2 to 30 parts by mass, especially preferably from 5 to 20 parts by mass based on 100 parts by mass of the cellulose acylate. It is preferred to increase the content of the plasticizer in the layer containing the light transmitting particles in order to improve the affinity between the cellulose acylate and the light transmitting particles and improve the brittleness.

(Ultraviolet Absorber)

It is more preferred that the light transmitting base material further contains a ultraviolet absorber (ultraviolet preventive) in order to have improved light fastness or prevent deterioration of a polarizing plate or an image display member of a liquid crystal display device such as liquid crystal compound.

As the ultraviolet absorber, preferred are those excellent in absorption performance of a ultraviolet light having a wavelength of 370 nm or less from the standpoint of preventing deterioration of liquid crystal and at the same time, showing absorption of a visible light having a wavelength of 400 nm or greater as low as possible in view of a good image display property. In particular, the transmittance at a wavelength of 370 nm is desirably 20% or less, preferably 10% or less, more preferably 5% or less. Examples of such an ultraviolet absorber include, but are not limited to, oxybenzophenone compounds, benzotriazole compounds, salicylic acid ester compounds, benzophenone compounds, cyanoacrylate compounds, nickel complex salt compounds, and high-molecular ultraviolet absorbing compounds containing an ultraviolet absorbing group as described above. Two or more of these ultraviolet absorbers may be used in combination.

In the invention, the ultraviolet absorber is used in an amount of from 0.1 to 5.0 parts by mass, preferably from 0.5 to 4.0 parts by mass, more preferably from 0.8 to 2.5 parts by mass, based on 100 parts by mass of the thermoplastic resin used for the light transmitting base material.

(Other Additives)

Furthermore, other various additives (for example, a deterioration inhibitor (e.g., antioxidant, peroxide decomposing agent, radical inhibitor, metal inactivating agent, acid scavenger, or amine), an optical anisotropy controlling agent, a release agent, an antistatic agent, and an infrared absorber) may be added to the compositions (dopes) for forming the light transmitting base material in respective preparation steps according to the usage. Such additives may be either in solid form or oil form. This means that they are not particularly limited by the melting temperature or boiling temperature thereof. As the infrared absorber, those described, for example, in JP-A-2001-194522 may be used.

These additives may be added at any stage in the dope preparation step, or a step of adding the additives may be provided as a final preparation step of dope preparation. The amount of each material is not particularly limited insofar as its function can be exerted. When the light transmitting base material is composed of multiple layers, the kind or amount of the thermoplastic resin and/or the additive may differ among respective layers. For example, described in JP-A-2001-151902 are conventionally known technologies. Details of these additives including the ultraviolet absorber are described in JIII Journal of Technical Disclosure, No. 2001-1745, pp. 16-22 (issued on Mar. 15, 2001 by Japan Institute of Invention and Innovation) and materials described therein are preferably used.

Such an additive is used preferably in an amount ranging from 0.001 to 20 mass % as needed based on the total composition constituting the light transmitting base material.

(Solvent)

The organic solvent for dissolving the light transmitting base material therein will next be described. As the organic solvent, conventionally known organic solvents are usable and, for example, those having a solubility parameter ranging from 17 to 22 are preferred. The solubility parameter indicates that described, for example, in J. Brandrup, E. H., et al, *Polymer Handbook,* 4th ed., VII/671 to VII/714. Examples of the organic solvent having such a solubility parameter include chlorides of a lower aliphatic hydrocarbon, lower aliphatic alcohols, ketones having from 3 to 12 carbon atoms, esters having from 3 to 12 carbon atoms, ethers having from 3 to 12 carbon atoms, aliphatic hydrocarbons having from 5 to 8 carbon atoms, aromatic hydrocarbons having from 6 to 12 carbon atoms, and fluoroalcohols (compounds described in, for example, paragraph (0020) of JP-A-8-143709 and paragraph (0037) of JP-A-11-60807).

The material constituting the light transmitting base material is preferably a solution obtained by dissolving in the organic solvent from 10 to 30 mass %, more preferably from 13 to 27 mass %, especially preferably from 15 to 25 mass % of the material. For controlling the concentration to fall within the above-described range, the solution may be prepared to give the predetermined concentration at a stage of dissolving the material; or a low-concentration solution (for example, from 9 to 14 mass %) may be prepared in advance, followed by increasing the concentration to a predetermined one in a concentration step which will be described later. Further, a predetermined low-concentration solution may be obtained by preparing a high-concentration solution of the material constituting the light transmitting base material, followed by the addition of various additives to the solution.

As the solvent, one or more of the above-described solvents may be used.

<Preparation of Dope>

Preparation of the solution (dope) of the material constituting the light transmitting base material such as cellulose acylate will next be described. The dissolution method of it is, as described above, not particularly limited and the dope is prepared by a room-temperature dissolution method, a cooling dissolution method, or a high-temperature dissolution method, or a combination thereof. As regards these methods, the preparation method of a cellulose acylate solution is described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-322947, JP-A-2-276830, JP-A-2000-273239, JP-A-11-71463, JP-A-4-259511, JP-A-2000-273184, JP-A-11-323017, and JP-A-11-302388. The technology in these dissolution methods of a cellulose acylate in an organic solvent can be applied also to the invention as needed within the scope thereof. The dope preparation methods described in these patent publications, particularly when a non-chlorine type solvent is used, are performed according to the method described in detail in JIII Journal of Technical Disclosure, No. 2001-1745, pp. 22-25. Further, the dope solution of a cellulose acylate is usually concentrated and filtered, which is described in detail similarly in JIII Journal of Technical Disclosure, No. 2001-1745, page 25. Incidentally, when the cellulose acylate is dissolved at a high temperature, the temperature is in most cases not lower than the boiling point of the organic solvent and in this case, the dope is dissolved under pressure.

<Cured Layer>

(Curable Compound)

The cured layer in the light scattering film of the invention is formed using a coating solution containing at least a curable compound (binder) and a polymerization initiator. The curable layer can be formed through a crosslink reaction of a heat curable and/or ionization radiation curable compound, which is a curable compound, or a polymerization reaction. The binder may be either a monomer binder or a polymer binder.

(Monomer Binder)

The monomer binder is preferably a heat curable and/or ionization radiation curable polyfunctional monomer or polyfunctional oligomer. Of these, the ionization radiation curable compound is preferred from the viewpoint of productivity and space saving by elimination of equipment.

The functional group of the ionization radiation curable polyfunctional monomer or polyfunctional oligomer is preferably a photopolymerizable, electron beam polymerizable, or radiation polymerizable one. Of these, a photopolymerizable functional group is preferred.

Examples of the photopolymerizable functional group include unsaturated polymerizable functional groups such as (meth)acryloyl, vinyl, styryl, and allyl, with (meth)acryloyl group being preferred.

As specific examples of the photopolymerizable polyfunctional monomer having a photopolymerizable functional group, those described in, for example, paragraphs from [0018] to [0020] of JP-A-2007-268753 serve as a reference.

As the monomer binder, monomers different in refractive index can be used for controlling the refractive index of each layer. Examples of the particularly high-refractive-index monomer include bis(4-methacryloylthiophenyl)sulfide, vinyl naphthalene, vinyl phenyl sulfide, 4-methacryloyloxyphenyl-4'-methoxyphenyl thioether, and bisarylfluorene acrylate monomer.

In addition, dendrimers as described in, for example, JP-A-2005-76005 and JP-A-2005-36105 and norbornene-ring-containing monomers as described in, for example, JP-A-2005-60425 are usable.

As the polyfunctional monomer, two or more may be used in combination.

One or more of these monomers having an ethylenically unsaturated group can be polymerized by exposure to ionization radiation or heating in the presence of a photoradical polymerization initiator or heat radical initiator.

Use of a photopolymerization initiator is preferred for the polymerization reaction of the photopolymerizable polyfunctional monomer. As the photopolymerization initiator, photoradical polymerization initiators and photocationic polymerization initiator are preferred, with photoradical polymerization initiators being particularly preferred.

(Crosslinking Polymer Binder)

As the curable compound to be used in the invention, polymers having a reactive group can be used.

As regards the polymers having a reactive group, paragraphs from (0024) to (0030) of JP-A-2007-268753 serve as a reference.

<Polymerization Initiator>

Polymerization of one or more monomers having an ethylenically unsaturated group can be performed by exposure to irradiation radiation or heating in the presence of a photoradical initiator or a heat radical initiator.

In preparing the light scattering film of the invention, a photopolymerization initiator and a heat polymerization initiator may be used in combination.

As regards the polymerization initiator and using method thereof, paragraphs from (0073) to (0089) of JP-A-2007-268753 serve as a reference.

<Other Additives of Cured Layer>

The surface concavo-convex shape and optical properties can be adjusted to fall within a preferred range by adding particles to the cured layer further (refer to FIG. 1C). As the particles to be added, inorganic or organic particles having a particle size of from 5 nm to 2.5 μm are preferred, with inorganic particles having a particle size of from 5 nm to 1.5 μm being more preferred. The particles may be either amorphous (including secondary aggregation) or flat insofar as they do not cause unnecessary wide-angle scattering.

The strength of the light scattering film equipped with the cured layer is preferably H or greater, more preferably 2H or greater, each in the pencil hardness test.

When the light scattering film of the invention is used as a protective film of a polarizing plate and is caused to adhere to a polarizing film, it is particularly preferred to carry out a hydrophilization treatment of the surface such as acid treatment, alkali treatment, plasma treatment, corona treatment or the like for improving the adhesion with the polarizing film.

The surface energy of the light transmitting base material on the side of Surface B is preferably 55 mN/m or greater, more preferably 60 mN/m or greater but not greater than 75 mN/m from the standpoint of adhesion or the like. It can be adjusted by the above-described surface treatment.

<Polarizing Plate>

(Constitution of Polarizing Plate)

In a polarizing plate having a polarizing film and a protective film placed on at least one side of the polarizing film, the light scattering film of the invention can be used as the protective film. In producing the polarizing plate using the light transmitting base material of the invention, intended optical properties of the invention can be obtained by using Surface A on the surface side of the polarizing plate and Surface B on the side of the polarizing film. A production cost of the polarizing plate can be reduced because the light transmitting base material serves also as the protective film. In addition, using the light transmitting base material of the invention as a surface on the backlight side can satisfy both improvement in front contrast ratio and reduction in moiré or luminance unevenness.

In the constitution of the polarizing plate, when the protective film is placed on both sides of the polarizing film, the light scattering film of the invention may be used as one protective film, while an ordinarily-used cellulose acetate film may be used as another protective film. A phase difference film may also be used as the another protective film.

Also in a preferred mode, the polarizing plate of the invention has the light scattering film of the invention on one side and has an optical compensation film having an optical anisotropic layer composed of a liquid crystal compound as another protective film.

(Polarizing Film)

Examples of a polarizing film include an iodine-base polarizing film, a dye polarizing film with a dichroic dye, and a polyene-base polarizing film. The iodine-base polarizing film and the dye-base polarizing film are usually prepared using a polyvinyl alcohol film.

As the polarizing film, a known polarizing film or a polarizing film cut out from a long polarizing film with the absorption axis thereof being neither parallel nor perpendicular to the longitudinal direction may be used. The long polarizing film with the absorption axis of the polarizing film being neither parallel nor perpendicular to the longitudinal direction is prepared by the following process.

Such a polarizing film can be prepared by holding both ends of a continuously-fed polymer film such as polyvinyl alcohol film with holding units, stretching the film at a draw ratio of from 1.1 to 20 at least in the film width direction while applying a tension, moving the holding units at both edges of the film to create a difference in the travelling speed of 3% or less in the longitudinal direction, and bending the film travelling direction in the state of the film being held at both edges such that the angle made by the film travelling direction at the outlet in the step of holding both edges of the film and the substantial stretching direction of the film is inclined at from 20° to 70°. Particularly, a polarizing film produced with an inclination angle of 45° is preferred in view of productivity.

(Optical Compensation Film)

In a preferred mode, one of the two protective films of the polarizing film other than the light scattering film of the invention is an optical compensation film having an optical compensation layer containing an optical anisotropic layer. The optical compensation film (phase difference film) can improve the viewing angle characteristics of a liquid crystal display screen.

As the optical compensation film, known ones are usable. From the viewpoint of widening a view angle, optical compensation films described in JP-A-2001-100042 are preferred.

<Type of Usage in the Invention>

(Image Display Device)

The light scattering film of the invention is suited for use in image display devices such as liquid crystal display device (LCD), plasma display panel (PDP), electroluminescence display (ELD), and cathode ray tube display device (CRT).

(Liquid Crystal Display Device)

The light scattering film and polarizing plate of the invention can be advantageously used in image display devices such as liquid crystal display device. Using it for the uppermost layer on the backlight side of a liquid crystal cell in a transmissive/semi-transmissive liquid crystal display device is especially preferred.

In general, a liquid crystal display device has a liquid crystal cell and two polarizing plates placed on both sides thereof. The liquid crystal cell has liquid crystals between two electrode substrates. Further, an optical anisotropic layer may be placed between the liquid crystal cell and one of the polarizing plates or two optical anisotropic layers may be placed between the liquid crystal cell and the two polarizing plates.

The liquid crystal cell is preferably a TN, VA, OCB, IPS, or ECB liquid crystal cell.

EXAMPLES

Preparation of Light Transmitting Base Material

Figure 4:
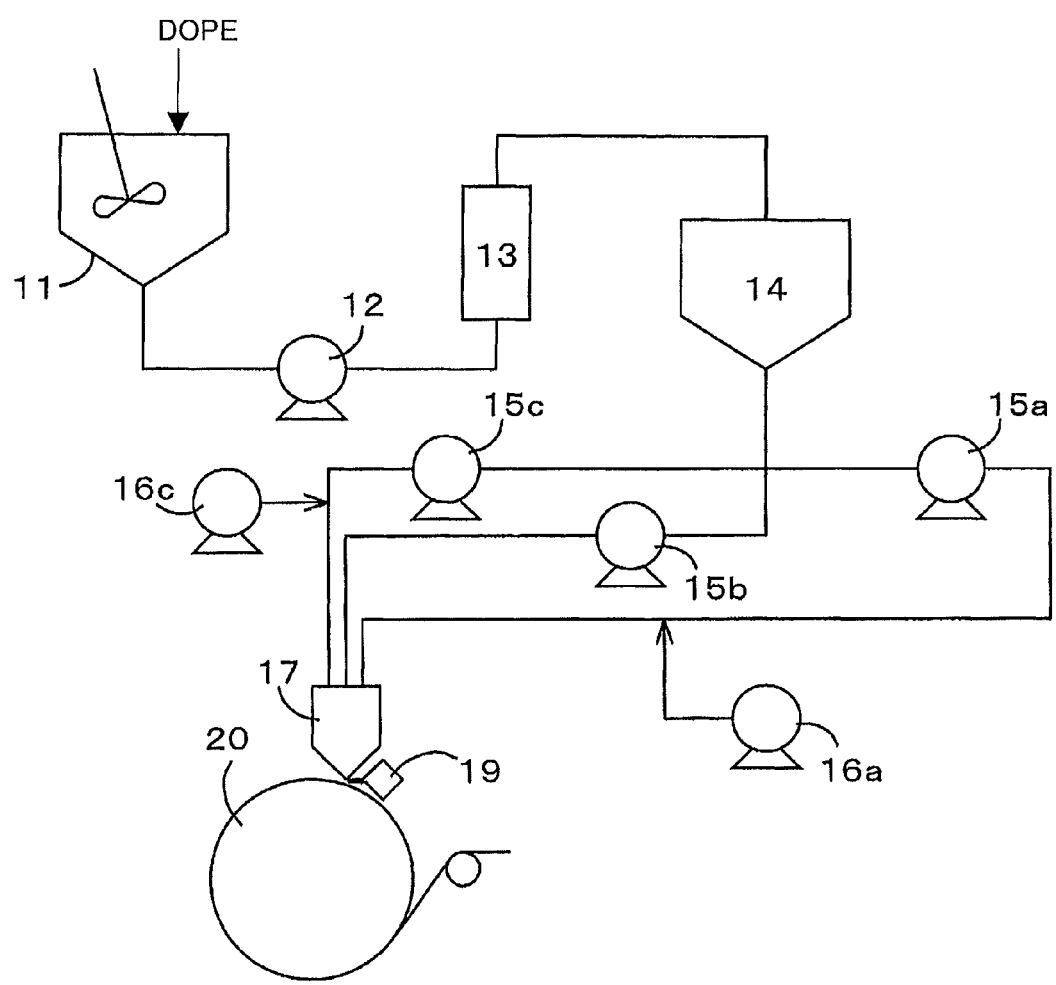
FIG. 4 is a view illustrating a solution film-forming apparatus using a casting drum.

Each dope was prepared according to the dope formulation shown in Table 1. A base layer dope and a surface layer dope were cast simultaneously to give a constitution as shown in Table 2 to prepare Light transmitting base material 1 to Light transmitting base material 16. Light transmitting base materials 1 to 15 were cast by using a casting apparatus as illustrated in FIG. 4 so that the dope for Surface layer 1 would come to the side of a mirror-finished drum cooled to −10° C. The cast dope was gelled by cooling while evaporating a solvent and then, the web was peeled off. After drying with hot air of 100° C. to decrease the residual solvent amount to 10 mass %, drying was conducted with hot wind of 140° C. for 10 minutes. Light transmitting base material 16 was cast using a casting apparatus illustrated in FIG. 5 onto a mirror-finished band of 18° C., followed by similar drying. The light transmitting base materials each had a refractive index of 1.48.

R972: primary particle size of about 16 nm, "AEROSIL R972", trade name; product of Nippon Aerosil S431: average particle size of about 2.5 μm, "SYLYSIA 431", trade name; product of Fuji Sylysia KEP-150: silica spherical particles having an average particle size of 2.5 μm, "SEAHOSTAR KEP-150", trade name of; product of Nippon Shokubai 2000M: melamine-resin spherical particles having an average particle size of 2.0 μm, "Optbeads 2000M", trade name; product of Nissan Chemical MX-350: crosslinked poly(methyl methacrylate) spherical particles having an average particle size of 3.5 μm, product of Soken Chemical & Engineering

TABLE 1

| Composition (parts by mass) | | | Dope A | B | C | D | E | F | G | H | I | J | K | L | M | N |
|---|---|---|---|---|---|---|---|---|---|---|---|---|---|---|---|---|
| Cellulose triacetate | | | 100 | 100 | 100 | 100 | 100 | 100 | 100 | 100 | 100 | 100 | 100 | 100 | 100 | 100 |
| Triphenyl phosphate | | | 8 | 8 | 8 | 8 | 8 | 8 | 8 | 8 | 8 | 8 | 8 | 8 | 8 | 8 |
| Biphenyl diphenyl phosphate | | | 4 | 4 | 4 | 4 | 4 | 4 | 4 | 4 | 4 | 4 | 4 | 4 | 4 | 4 |
| Ultraviolet absorber | | | 2.0 | 2.0 | 2.0 | 2.0 | 2.0 | 2.0 | 2.0 | 2.0 | 2.0 | 2.0 | 2.0 | 2.0 | 2.0 | 2.0 |
| Fine particles | R972 | 1.47 | 0.1 | — | 10.0 | — | — | — | — | — | — | — | — | — | — | — |
| | S431 | 1.47 | — | — | — | 10.0 | — | — | — | — | — | — | — | — | — | — |
| | 2000M | 1.65 | — | — | — | — | 10.0 | — | — | — | — | — | — | — | — | — |
| | KEP150 | 1.47 | — | — | — | — | — | 15.0 | — | — | — | — | — | — | — | — |
| | MX-350 | 1.50 | — | — | — | — | — | — | 15.0 | — | — | — | — | — | — | — |
| | XX-82S | 1.50 | — | — | — | — | — | — | — | 15.0 | — | — | — | — | — | — |
| | XX-104S | 1.55 | — | — | — | — | — | — | — | — | 15.0 | — | — | — | — | — |
| | XX-76S | 1.50 | — | — | — | — | — | — | — | — | — | 5.0 | 15.0 | — | — | — |
| | XX-147S | 1.52 | — | — | — | — | — | — | — | — | — | — | — | 15.0 | — | — |
| | XX-119S | 1.50 | — | — | — | — | — | — | — | — | — | — | — | — | 15.0 | — |
| | MX-1500 | 1.50 | — | — | — | — | — | — | — | — | — | — | — | — | — | 15.0 |

(Refractive index)

TABLE 2

Figure 5:
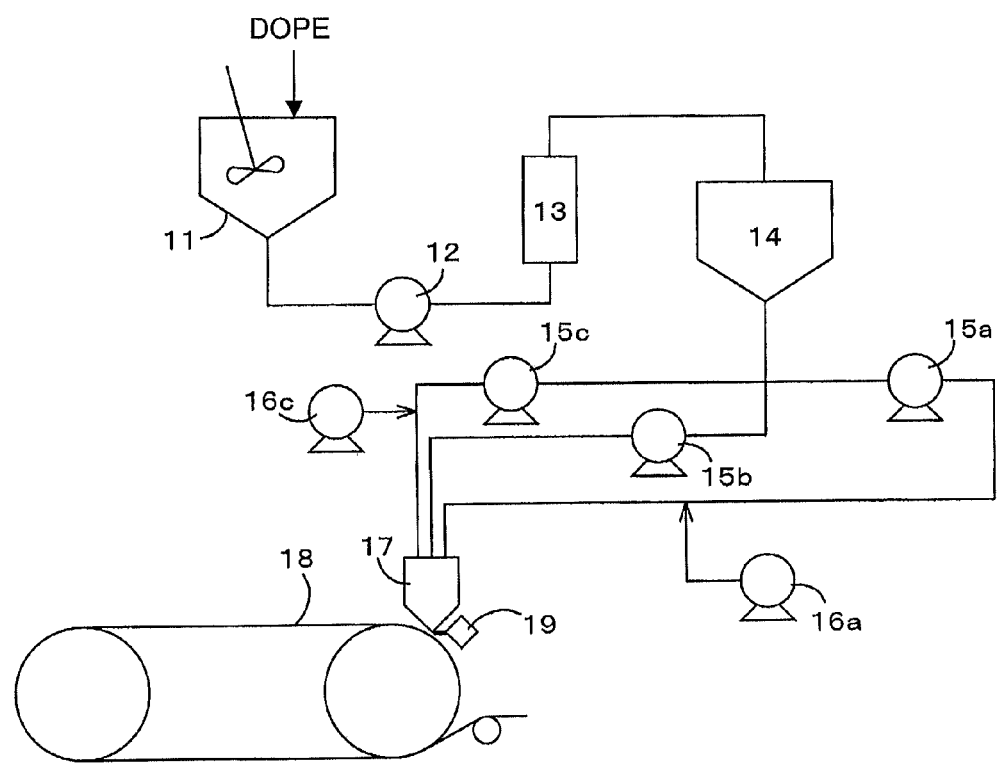
FIG. 5 is a view illustrating a solution film-forming apparatus using a casting band.

| Base material No. | Dope formulation | | | Film thickness (μm) | | | Casting apparatus | Surface shape | Rt μm |
|---|---|---|---|---|---|---|---|---|---|
| | Surface layer 1 | Base layer | Surface layer 2 | Surface layer 1 | Base layer | Surface layer 2 | | | |
| Base material 1 | A | B | C | 3 | 32 | 5 | FIG. 4 | C: random | 0.5 |
| Base material 2 | A | B | D | 3 | 32 | 5 | FIG. 4 | C: wavy | 1.5 |
| Base material 3 | A | B | E | 3 | 32 | 5 | FIG. 4 | B* | 0.8 |
| Base material 4 | A | B | F | 3 | 32 | 5 | FIG. 4 | B | 0.6 |
| Base material 5 | A | B | G | 3 | 32 | 5 | FIG. 4 | A** | 1.8 |
| Base material 6 | A | B | H | 3 | 52 | 5 | FIG. 4 | A | 3.5 |
| Base material 7 | A | B | I | 3 | 32 | 5 | FIG. 4 | A | 3.7 |
| Base material 8 | A | B | J | 3 | 27 | 10 | FIG. 4 | A | 3.6 |
| Base material 9 | A | B | K | 3 | 29.5 | 7.5 | FIG. 4 | A | 4.8 |
| Base material 10 | A | B | K | 3 | 32 | 5 | FIG. 4 | A | 4.6 |
| Base material 11 | A | B | K | 3 | 33.7 | 3.3 | FIG. 4 | A | 4.3 |
| Base material 12 | A | B | L | 3 | 29.5 | 7.5 | FIG. 4 | A | 4.2 |
| Base material 13 | A | B | M | 3 | 29.5 | 7.5 | FIG. 4 | A | 6.7 |
| Base material 14 | A | B | N | 3 | 29.5 | 7.5 | FIG. 4 | A | 11 |
| Base material 15 | A | B | A | 3 | 32 | 5 | FIG. 4 | C: flat | 0.1 |
| Base material 16 | A | B | H | 3 | 52 | 5 | FIG. 5 | A | 3.2 |

*B: The flat portion was slightly unclear or the surface shape was wavy.
**A: The intended preferable surface shape was obtained.

Materials used for preparation of the base material are shown below.

Cellulose triacetate: degree of substitution with acetyl: 2.86, viscosity-average polymerization degree: 310

Ultraviolet absorber: benzotriazole ultraviolet absorber (a 20/80 mass % mixture of "TINUVIN 326"/"TINUVIN 328", each product of Ciba Japan)

MX-1500: crosslinked poly(methyl methacrylate) spherical particles having an average particle size of 20 μm, product of Soken Chemical & Engineering XX-76S: cross-linked poly(methyl methacrylate) spherical particles having an average particle size of 8 μm, product of Sekisui Plastics XX-82S: cross-linked poly(methyl methacrylate) spherical particles having an average particle size of 6 product of Sekisui Plastics XX-104S: cross-linked poly(methyl methacrylate)-styrene copolymer spherical particles having an average particle size of 6 μM, product of Sekisui Plastics XX-119S: cross-linked polymethyl methacrylate spherical particles having an average particle size of 10 product of Sekisui Plastics XX-147S: cross-linked poly(methyl methacrylate)styrene copolymer spherical particles having an average particle size of 8 μm, product of Sekisui Plastics Catalyst 4050: a hot acid generator (55%) solution, product of Nihon Cytec Industries Coronate L solution: polyisocyanate, Coronate L (ethyl acetate solution), a solution obtained by diluting Colonate L of Nippon Polyurethane Industry to a solid content of 50% with MEK TEDA: urethane curing catalyst, triethylene diamine (1,4-diazabicyclo[2,2,2]octane)

MEK: methyl ethyl ketone

MIBK: methyl isobutyl ketone

PGM: propylene glycol monomethyl ether (1-methoxy-2-propanol)

TABLE 3

| Composition (mass%) | | A | B | C | D | E | F | G | H | I |
|---|---|---|---|---|---|---|---|---|---|---|
| Material of solid content | PET30 | 15.5 | 14.7 | 14.6 | 15.0 | 14.7 | | | | |
| | DPHA | 3.9 | 3.7 | 3.6 | 3.8 | 3.7 | | | | |
| | R972 | | 1.0 | | | | | | | |
| | S431 | | | 1.2 | | | | | | |
| | Ethocel 200 | | | | 0.6 | | | | | |
| | PMMA | | | | | 1.0 | | | | |
| | ACA320 | | | | | | | 38.0 | | |
| | Irg.-127 | 0.6 | 0.6 | 0.6 | 0.6 | 0.6 | 1.0 | | | |
| | CAB | | | | | | | 11.0 | | |
| | Cymel 303 | | | | | | | | 18.0 | |
| | Catalyst 4050 | | | | | | | | 3.6 | |
| | Colonate L soln. | | | | | | | 18.0 | | |
| | TEDA | | | | | | | (0.05) | | |
| Solvent | MEK | 24 | 24 | 24 | 24 | 24 | 24 | 15 | 24 | 30 |
| | MIBK | 56 | 56 | 56 | 56 | | | 56 | 54 | 70 |
| | Toluene | | | | | 56 | | | | |
| | PGM | | | | | | 37 | | | |

The base-layer dope and the surface-layer dope were controlled to give the solid concentration of 23 mass % and 18 mass %, respectively, with a 90:10 (mass ratio) methylene chloride:methanol mixed solvent.

The refractive index of particles was determined by dispersing, in a mixture of two solvents different in refractive index which had a refractive index changed by changing their mixing ratio, an equal amount of particles, measuring the turbidity of the dispersion, and then measuring the refractive index of the resulting dispersion when the turbidity shows the minimum by using an Abbe refractometer.

(Preparation of Cured-Layer Forming Coating Solution)

Coating solutions A to I (I was composed only of a solvent) shown in Table 3 were prepared.

Materials used for the preparation are shown below.

PET-30: a mixture of pentaerythritol triacrylate and pentaerythritol tetraacrylate, product of Nippon Kayaku DPHA: a mixture of dipentaerythritol hexaacrylate and dipentaerythritol pentaacrylate, product of Nippon Kayaku Irg.-127: photopolymerization initiator "Irgacure 127", trade name; product of Ciba Specialty Chemicals CAB: cellulose acetate butylate, "CAB-381-2", trade name; product of Eastman Chemical Ethocel: ethyl cellulose, "ETHOCEL 200 Industrial", trade name; product of Dow Chemical PMMA: polymethyl methacrylate having an average molecular weight of 350000

ACA320: an acid-containing acrylate polymer "Cyclomer P (ACA320)", trade name; product of Daicel Chemical Industries CYMEL 303: a methylol melamine curable compound, product of Nihon Cytec Industries (Formation of Cured Layer by Application The cured-layer forming coating solutions were applied onto the light transmitting base materials shown in Table 4 to give respective dry film thicknesses by using the slot die coater shown in FIG. 1 of JP-A-2003-211052, followed by drying at 30° C. for 15 seconds and further at 90° C. for 20 seconds. Thereafter, the resulting layers were cured by exposing them to an ultraviolet ray at a dose of 500 mJ/cm$^2$ with the use of "Air-Cooled Metal Halide Lamp" (manufactured by Eye Graphics Co., Ltd.) of 160 W/cm under nitrogen purging to form cured layers, thereby forming light scattering films 1 to 24 and 27 to 38. The resulting cured layers were placed on the surface of the light transmitting base materials on the side of Surface layer 2. For the preparation of Films 6 and 16 having a dry film thickness of 0.05 μm, the solid concentration of each of the coating solutions was adjusted to 1 mass %. For the preparation of Films 34 and 36 having a dry film thickness of 10 μm or greater, the solid concentration of the coating solutions was adjusted to 50 mass %. Film 15 using Coating solution I was formed at a coating weight of 5.0 cm$^3$/m$^2$.

Films 25 and 26 using Coating solutions G and H were prepared similarly except that step conditions were changed so as to carry out drying and heat curing at 90° C. for 2 minutes while preventing the contact with the coated surface and then conduct heat curing at 100° C. for 5 minutes. As regards Coating solution G of Film 25, Coating solution G not containing TEDA was prepared. A solution supply system was constituted just before application and a 2% solution of TEDA was added, followed by mixing in a static mixer. The resulting coating solution was then applied at once. A take-up step was not inserted between casting of a dope and the production of a light scattering film.

TABLE 4

| Film No. | Base material No. | HC Coating solution | HC Thickness (μm) | HC Ra (μm) | HC Sm (μm) | HC θa (°) | Frequency (%) of inclination angle 0° ≦ >1.0° | Frequency (%) of inclination angle 1.0° ≦ >10° | Frequency (%) of inclination angle 10°≦ | Δ Ra | Film thickness ratio t(min)/t(max) | Remarks |
|---|---|---|---|---|---|---|---|---|---|---|---|---|
| Film 1 | Base material 1 | A | 1.2 | 0.02 | 34 | 0.2 | 92% | 8% | 0% | 0.01 | 0.7 | Comp. Ex. |
| Film 2 | Base material 2 | A | 1.2 | 0.36 | 42 | 2.1 | 12% | 65% | 23% | 003 | 0.2 | Comp. Ex. |
| Film 3 | Base material 3 | A | 1.2 | 0.14 | 46 | 0.7 | 61% | 39% | 0% | 0.02 | 0.4 | Comp. Ex. |
| Film 4 | Base material 4 | A | 1.2 | 0.11 | 44 | 0.5 | 68% | 32% | 0% | 0.03 | 0.6 | Comp. Ex. |
| Film 5 | Base material 5 | A | 1.2 | 0.47 | 65 | 3.1 | 22% | 61% | 17% | 0.06 | <0.1 | Ex. |
| Film 6 | Base material 6 | A | 0.05 | 0.56 | 43 | 5.1 | 40% | 36% | 24% | 0.02 | 0.3 | Comp. Ex. |
| Film 7 | Base material 6 | A | 0.8 | 0.54 | 73 | 4.0 | 11% | 65% | 24% | 0.07 | <0.1 | Ex. |
| Film 8 | Base material 6 | A | 1.2 | 0.41 | 113 | 2.7 | 13% | 74% | 13% | 0.2 | <0.1 | Ex. |
| Film 9 | Base material 16 | A | 1.2 | 0.38 | 122 | 2.6 | 13% | 75% | 12% | 0.21 | <0.1 | Ex. |
| Film 10 | Base material 7 | A | 0.8 | 0.56 | 81 | 3.9 | 12% | 65% | 23% | 0.07 | <0.1 | Ex. |
| Film 11 | Base material 7 | A | 1.2 | 0.44 | 108 | 2.9 | 12% | 75% | 13% | 0.19 | <0.1 | Ex. |
| Film 12 | Base material 7 | A | 2.4 | 0.24 | 192 | 1.6 | 24% | 68% | 8% | 0.39 | <0.1 | Ex. |
| Film 13 | Base material 8 | A | 0.8 | 0.37 | 154 | 2.7 | 20% | 72% | 8% | 0.19 | <0.1 | Ex. |
| Film 14 | Base material 8 | A | 1.2 | 0.25 | 155 | 2.0 | 24% | 69% | 7% | 0.31 | <0.1 | Ex. |
| Film 15 | Base material 9 | I | 0 | 0.65 | 48 | 6.2 | 31% | 40% | 29% | — | — | Comp. Ex., |
| Film 16 | Base material 9 | A | 0.05 | 0.62 | 61 | 6.0 | 25% | 54% | 21% | 0.03 | 0.3 | Comp. Ex. |
| Film 17 | Base material 9 | A | 0.8 | 0.49 | 98 | 3.4 | 9% | 72% | 19% | 0.13 | <0.1 | Ex. |
| Film 18 | Base material 9 | A | 1.2 | 0.41 | 12 | 2.8 | 12% | 75% | 13% | 0.21 | <0.1 | Ex. |
| Film 19 | Base material 9 | A | 1.5 | 0.32 | 133 | 2.2 | 19% | 71% | 10% | 0.3 | <0.1 | Ex. |
| Film 20 | Base material 9 | B | 1.5 | 0.36 | 32 | 4.1 | 14% | 69% | 17% | 0.26 | <0.1 | Ex. |
| Film 21 | Base material 9 | D | 1.5 | 0.24 | 106 | 2.0 | 22% | 70% | 8% | 0.38 | <0.1 | Ex. |
| Film 22 | Base material 9 | D | 3 | 0.19 | 151 | 1.5 | 24% | 70% | 6% | 0.43 | <0.2 | Ex. |
| Film 23 | Base material 9 | E | 1.5 | 0.26 | 118 | 1.9 | 22% | 68% | 10% | 0.36 | <0.1 | Ex. |
| Film 24 | Base material 9 | F | 3 | 0.33 | 122 | 2.6 | 19% | 73% | 8% | 0.29 | 0.2 | Ex. |
| Film 25 | Base material 9 | G | 3 | 0.35 | 136 | 2.8 | 18% | 73% | 9% | 0.27 | 0.2 | Ex. |
| Film 26 | Base material 9 | H | 1.5 | 0.34 | 124 | 2.4 | 19% | 73% | 8% | 0.28 | <0.1 | Ex. |
| Film 27 | Base material 10 | A | 0.8 | 0.44 | 113 | 3.2 | 13% | 68% | 19% | 0.11 | <0.1 | Ex. |
| Film 28 | Base material 11 | A | 0.8 | 0.41 | 117 | 2.7 | 17% | 70% | 13% | 0.07 | <0.1 | Ex. |
| Film 29 | Base material 12 | A | 0.8 | 0.45 | 95 | 3.4 | 9% | 72% | 19% | 0.17 | <0.1 | Ex. |
| Film 30 | Base material 12 | A | 1.5 | 0.29 | 141 | 2.2 | 20% | 70% | 10% | 0.33 | <0.1 | Ex. |
| Film 31 | Base material 12 | A | 3 | 0.14 | 174 | 2.2 | 24% | 72% | 4% | 0.48 | <0.1 | Ex. |
| Film 32 | Base material 13 | A | 3 | 0.51 | 119 | 2.6 | 18% | 70% | 12% | 0.22 | <0.1 | Ex. |
| Film 33 | Base material 13 | A | 5 | 0.28 | 186 | 1.5 | 24% | 69% | 7% | 0.45 | <0.1 | Ex. |
| Film 34 | Base material 13 | A | 12 | 0.04 | 213 | 0.7 | 59% | 41% | 0% | 0.69 | 0.8 | Comp. Ex. |
| Film 35 | Base material 14 | A | 5 | 0.21 | 174 | 0.8 | 53% | 44% | 3% | 0.89 | 0.2 | Comp. Ex. |
| Film 36 | Base material 14 | A | 12 | 0.09 | 209 | 0.6 | 38% | 61% | 1% | 1.01 | 0.5 | Comp. Ex. |
| Film 37 | Base material 15 | None | — | 0.01 | 362 | 0.0 | 100% | 0% | 0% | — | — | Comp. Ex. |
| Film 38 | Base material 15 | C | 3.5 | 0.44 | 87 | 4.8 | 8% | 65% | 27% | −0.4 | 0.4 | Comp. Ex |

| Film No. | Transmission image Clarity (comb width: 2 mm) | Distribution of scattering angle 1(4°)/IO × 100 | Haze Surface (%) | Haze Internal (%) | Display performance moiré | Display performance Front luminance | Remarks |
|---|---|---|---|---|---|---|---|
| Film 1 | 97.6 | 0.2 | 3.5 | 0.1 | D | A | Comp. Ex. |
| Film 2 | 86.5 | 2.3 | 11.8 | 0.2 | D | B | Comp. Ex. |
| Film 3 | 63.7 | 0.8 | 3.9 | 48.1 | D | C | Comp. Ex. |
| Film 4 | 77.5 | 0.5 | 8.0 | 0.2 | D | A | Comp. Ex. |
| Film 5 | 43.9 | 3.4 | 33.9 | 0.4 | B | B | Ex. |
| Film 6 | 71.7 | 2.0 | 34.8 | 0.4 | D | B | Comp. Ex. |
| Film 7 | 17.2 | 6.7 | 39.4 | 0.5 | A | A | Ex. |
| Film 8 | 17.5 | 5.5 | 22.5 | 0.6 | A | A | Ex. |
| Film 9 | 18.3 | 5.3 | 21.5 | 0.6 | A | A | Ex. |
| Film 10 | 14.4 | 6.8 | 34.9 | 12.3 | A | B | Ex. |
| Film 11 | 14.1 | 6.2 | 19.6 | 12.0 | A | A | Ex. |
| Film 12 | 43.5 | 4.5 | 5.7 | 12.4 | B | A | Ex. |
| Film 13 | 27.5 | 4.0 | 13.7 | 0.4 | A | A | Ex. |
| Film 14 | 36.2 | 3.2 | 10.6 | 0.3 | A | A | Ex. |
| Film 15 | 62.0 | 2.6 | 42.1 | 0.6 | D | C | Comp. Ex., |
| Film 16 | 57.3 | 2.7 | 41.1 | 0.5 | C | C | Comp. Ex. |
| Film 17 | 13.9 | 6.5 | 32.8 | 0.5 | A | A | Ex. |
| Film 18 | 15.9 | 5.7 | 24.4 | 0.5 | A | A | Ex. |
| Film 19 | 27.2 | 4.3 | 14.4 | 0.5 | A | A | Ex. |
| Film 20 | 42.1 | 2.9 | 25.7 | 0.8 | B | B | Ex. |
| Film 21 | 20.8 | 4.2 | 14.2 | 0.5 | A | A | Ex. |
| Film 22 | 38.2 | 3.6 | 8.0 | 0.6 | A | A | Ex. |
| Film 23 | 22.6 | 4.3 | 11.7 | 0.5 | A | A | Ex. |
| Film 24 | 42.1 | 3.9 | 15.8 | 0.6 | B | A | Ex. |
| Film 25 | 43.6 | 3.8 | 20.9 | 0.7 | B | A | Ex. |
| Film 26 | 26.4 | 4.0 | 14.8 | 0.5 | A | A | Ex. |
| Film 27 | 20.7 | 6.3 | 30.8 | 0.4 | A | A | Ex. |
| Film 28 | 28.2 | 5.4 | 24.5 | 0.2 | A | A | Ex. |

TABLE 4-continued

| Film | | | | | | | |
|---|---|---|---|---|---|---|---|
| Film 29 | 9.5 | 7.2 | 29.0 | 5.2 | A | B | Ex. |
| Film 30 | 22.4 | 4.8 | 12.2 | 5.0 | A | A | Ex. |
| Film 31 | 46.1 | 4.1 | 3.0 | 5.1 | B | A | Ex. |
| Film 32 | 33.6 | 4.6 | 23.2 | 0.3 | A | A | Ex. |
| Film 33 | 61.4 | 3.3 | 10.3 | 0.3 | B | A | Ex. |
| Film 34 | 76.0 | 2.6 | 3.5 | 0.3 | D | A | Comp. Ex. |
| Film 35 | 62.1 | 2.7 | 17.3 | 0.2 | C | A | Comp. Ex. |
| Film 36 | 68.8 | 2.8 | 3.9 | 0.3 | D | A | Comp. Ex. |
| Film 37 | 99.2 | 0.0 | 0.0 | 0.2 | E | A | Comp. Ex. |
| Film 38 | 17.8 | 4.9 | 42.4 | 0.8 | A | D | Comp. Ex |

(Remodeling of Notebook Computer)

A notebook computer ("R700C-XP50K") manufactured by LG Display was disassembled. An upper diffusion sheet between a backlight and a liquid crystal panel was removed and a backlight-side polarizing plate attached to a liquid crystal cell was peeled. Light scattering films 1 to 38 were bonded, with an adhesive, to a polarizing plate obtained by attaching a protective film ("TD80U", trade name; product of Fujifilm) having no light scattering property on both sides of a polarizer.

(Evaluation of Light Scattering Film and Image Display Device Using it)

The light scattering films (Film 1) to (Film 38) were evaluated for the following.

(1) Measurement of Surface Shape

An arithmetic average roughness Ra, an average peak-to-valley distance Sm, and an average inclination angle θa of the concavo-convex surface were measured using "Surfcoder MODEL SE-3500" (trade name; product of Kosaka Laboratory) in accordance with JIS-B0601 (1994, 2001). Also, the maximum height Rt and Ra of the base material film were measured and based on them, ΔRa was determined.

(2) Measurement of Inclination Angle Distribution Profile

The inclination angle of Surface A of each of the light scattering films was measured using "SXM520-AS150" (trade name; product of Micromap/USA). As a light source, a halogen lamp having, inserted therein, an interference filter with a center wavelength of 560 nm was used. An objective lens has a 10× magnification and data were taken in by using a ⅔ inch CCD having pixels of 640×480. By this, measurement pitches in the lengthwise and widthwise directions were 1.3 μm², a measurement unit for an inclination angle was 0.8 μm², and a measurement area was 500,000 μm² (0.5 mm²).

The inclination angle was calculated from the height data at three points employed as the measurement unit. Based on the total measurement data, the integral value of the frequency of each of inclination angle components having inclination angles of 0° or greater but less than 1.0°, 1.0° or greater but less than 10°, and 10° or greater was determined.

(3) Observation of Surface Shape of Light Transmitting Base Material

The cross-section was cut from the light transmitting base material by using a microtome and the surface shape of the base material was observed with a scanning electron microscope from the cross-sectional direction and oblique direction of the base material.

(4) Measurement of Thickness of Cured Layer

A sample was prepared by cutting the cross-section of the light scattering film along the center of a particle with a microtome. After staining with vapor of osmic acid for one day, a film thickness profile of the cured layer was observed through a scanning electron microscope. With the minimum thickness of the cured layer directly above the particle as $t_{min}$ and the maximum thickness of the cured layer at another portion such as that on the flat portion as $t_{max}$, both of these thicknesses were measured at ten points and an average ratio of them was calculated as a film thickness ratio ($t_{min}/t_{max}$).

(5) Clarity of Transmission Image

Image clarity (%) of the light scattering film was measured in accordance with JIS K7105 (1999) by using "ICM-1T" (trade name; product of Suga Test Instruments). The image clarity in the invention is defined as a value measured using an optical comb of 2.0 mm.

(6) Measurement of Light Scattering Profile

Figure 3:
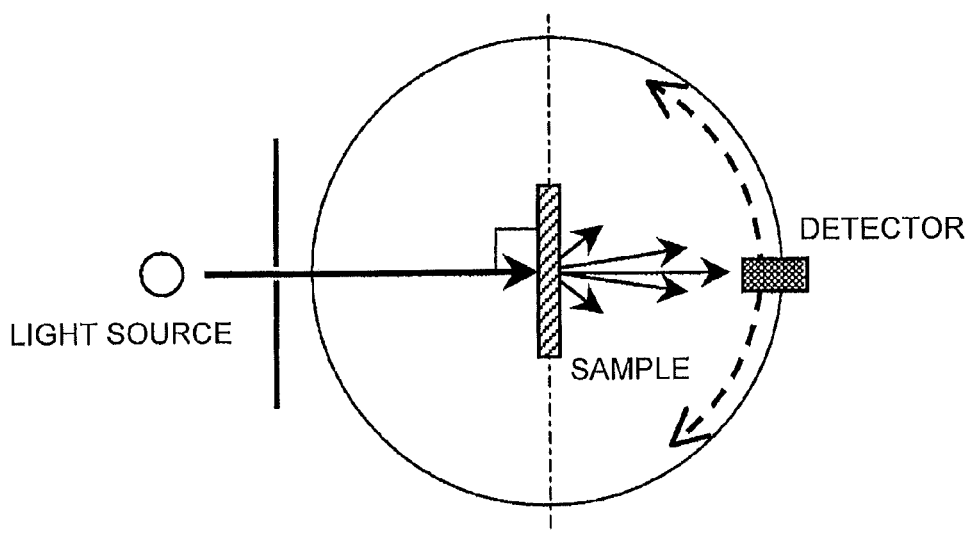
FIG. 3 is a schematic view of a light-scattering profile measuring instrument.

A light scattering profile was measured using a photogoniometer ("GP-5", trade name; product of Murakami Color Research Laboratory). As illustrated in FIG. 3, convergent light with an angle of 1.5° was used as the light source and an acceptance angle of a detector was set at 2°. The light scattering profile was obtained by introducing a light from the normal direction of the light scattering film and measuring an amount of a transmitted and scattered light while continuously changing the angle within a plane including the normal line of the film. As regards the amount of a transmitted and scattered light, the amount of light at the light source without a film was set at 1.

(7) Measurement of Haze

[1] A total haze (H) of the light scattering film was measured in accordance with JIS K7136 by using a haze meter "NDH2000" (trade name; product of Nippon Denshoku Industries).

[2] An internal haze (Hin) of the light scattering film was determined by adding several drops of a microscope immersion oil ("Immersion oil Type A", trade name; product of Nikon Corp., refractive index n=1.515) to the surface and back surface of the light scattering film, sandwiching the resulting film from both sides thereof between two glass plates having a thickness of 1 mm ("Micro slide glass Product No. S9111", trade name; product of Matsunami Glass), making these two glass plates and the optical film stick together completely, measuring the haze of it while removing a surface haze, and subtracting, from the resulting haze, a separately measured haze of two glass plates having only a silicone oil inserted therebetween.

[3] A value obtained by subtracting the internal haze (Hin) determined in [2] from the total haze (H) measured in [1] was determined as a surface haze (Hout) of the film.

(8) Moiré

A signal was input into the liquid crystal device from a video signal generator ("VG-848", trade name; product of Astro Design) and the screen of the device was visually observed from various directions in a darkroom while employing a full solid and 128/256-level gray display mode. Presence or absence of generation of moiré was observed.

A: No moiré was observed and good display was obtained.

B: Slight moiré was observed but it does not disrupt viewing, which was not problematic.

C: Moiré was observed and it disturbs viewing a little, which was problematic.

D: Moiré was observed clearly, which was problematic.

E: Moiré was observed clearly and very concerned, which was clearly problematic.

(9) Front White Luminance

In a similar manner to that employed in the evaluation of moiré, a luminance was measured using a luminance colorimeter ("BM5-A", trade name; product of Topcon Corporation) from the normal line (front) direction of the plane of the liquid crystal device in a darkroom while employing a full solid and 256/256/level white display mode. The luminance at five points, that is, center of the screen and positions 3 cm up, bottom, light, and left from the center was measured and an average was computed. It was evaluated based on the following three criteria with the luminance of a liquid crystal display device not using a light scattering film for the surface of its polarizing plate on the backlight side as a reference value.

A: No reduction (99% or greater of the reference value)

B: Almost no reduction (98% or greater but less than 99% of the reference value)

C: Slight reduction (95% or greater but less than 98% of the reference value)

D: Reduction (less than 95% of the reference value)

Evaluation results of each sample and display performance of a liquid crystal device using the sample as a protective film of a polarizing plate on the backlight side are shown in Tables 2 and 4.

Light transmitting base materials 8, 9, 10, 11, and 12 had a haze of 28%, 45%, 35%, 24%, and 49%, respectively and a film having a cured layer of from 0.8 μm to 1.5 μm thick formed thereon satisfied both moiré elimination and front luminance.

[Examples Using Cellulose Acetate Butylate as Base Material]

In a similar manner to that employed in the preparation of Film 9 except that dopes having compositions shown in Table 5 were prepared, respectively, and Dope P-1, Dope P-2, and Dope P-3 were used instead of Dope A (surface layer 1), Dope B (base layer), and Dope H (surface layer 2) of Base material 16, respectively, Film 39 was formed. The light transmitting base material had a refractive index of 1.48. It had a surface shape composed of a flat portion and a spherical raised portion.

(Example Using Polycarbonate as Base Material)

Dopes having compositions shown in Table 5 were prepared, respectively. In a similar manner to that employed in the preparation of Film 9 except that Dope A for Surface layer 1 of Base material 16 was not used; Dope Q-1 was placed on the side of a band surface instead of Dope B (surface layer); Dope Q-2 was used instead of Dope H (surface layer 2); and two-layer co-casting was conducted, Film 40 was prepared. Raw materials used for the preparation are shown below. The light transmitting base material had a refractive index of 1.58. It had a surface shape composed of a flat portion and a spherical raised portion.

Polycarbonate: a polycarbonate resin having a weight-average molecular weight of 45,000

SBX-8: crosslinked polystyrene spherical particles, average particle size: 8 μm, product of Sekisui Plastics

TABLE 5

| Composition (parts by mass) | | | Dope | | | | |
|---|---|---|---|---|---|---|---|
| | | | P-1 | P-2 | P-3 | Q-1 | Q-2 |
| Cellulose acetate butylate | | | 100 | 100 | 100 | — | — |
| Polycarbonate | | | — | — | — | 100 | 100 |
| Triphenyl phosphate | | | 8 | 8 | 8 | — | — |
| Biphenyl diphenyl phosphate | | | 4 | 4 | 4 | — | — |
| Ultraviolet absorber | | | 2.0 | 2.0 | 2.0 | 2.0 | 2.0 |
| Fine particles | R972 | 1.47 (refractive index) | 0.1 | — | — | — | — |
| | XX-76S | 1.50 (refractive Index) | — | — | 15.0 | — | — |
| | SBX-8 | 1.59 (refractive index) | — | — | — | — | 15.0 |
| Solvent | Methylene chloride | | 441 | 324 | 500 | 290 | 453 |
| | Methanol | | 78 | 57 | 88 | 51 | 80 |

Films 39 and 40 were evaluated in a similar manner. As a result, it has been confirmed that they exhibited almost similar performances to those of Film 9.

It has been found from Table 4 that an image display device causing neither reduction in front white luminance nor moiré can be obtained using the light scattering films of the invention as a protective film of a polarizing plate on the side of a backlight of a liquid crystal display device.

What is claimed is:

1. A method for producing a light scattering film, comprising:

casting onto a support a dope containing at least a thermoplastic resin and light transmitting particles to provide a casted film, and peeling and drying the casted film to prepare a light transmitting base material;

applying an coating solution containing at least a curable compound, a polymerization initiator, and a solvent onto the light transmitting base material and drying the solvent; and curing the curable compound to form a cured layer, wherein at least one surface of the light transmitting base material has an asperity shape, the light transmitting particles have an average primary particle size greater than 2.5 μm but not greater than 12 μm, the cured layer has an average thickness of 0.1 μm or greater but not greater than 10.0 μm, and the cured layer satisfies formulae (1) to (3):

$$0.05 \text{ μm} \leq Ra \leq 0.8 \text{ μm} \quad (1)$$

$$10 \text{ μm} \leq Sm \leq 300 \text{ μm} \quad (2)$$

$$1.5° \leq \theta a \leq 4.5° \quad (3)$$

wherein Ra represents an arithmetic average roughness of the cured layer, Sm represents an average peak-to-valley distance of a surface of the cured layer, and θa represents an average inclination angle of the surface of the cured layer, each based on JIS B 0601.

2. A method for producing a light scattering film, comprising:
- casting onto a support a dope containing at least a thermoplastic resin and light transmitting particles to provide a casted film, and peeling and drying the casted film to prepare a light transmitting base material;
- applying an coating solution containing at least a curable compound, a polymerization initiator, and a solvent onto the light transmitting base material and drying the solvent; and
- curing the curable compound to form a cured layer,
- wherein at least one surface of the light transmitting base material has an asperity shape,
- the light transmitting particles have an average primary particle size greater than 2.5 μm but not greater than 12 μm,
- the cured layer has an average thickness of 0.1 μm or greater but not greater than 10.0 μm, and
- surface inclination angles of the cured layer have the following distribution:
  - (a) an integral value of a frequency of 0° or greater but less than 1.0° is less than 25%,
  - (b) an integral value of a frequency of 1.0° or greater but less than 10° is 60% or greater but less than 100%, and
  - (c) an integral value of a frequency of 10° or greater is 0% or greater but less than 25%.

3. The method according to claim 1, which does not comprise a take-up step between the casting of the dope and completion of the light scattering film.

4. The method according to claim 2, which does not comprise a take-up step between the casting of the dope and completion of the light scattering film.

5. A light scattering film comprising:
- a light transmitting base material having a thermoplastic resin as a main component and light transmitting particles having an average primary particle size greater than 2.5 μm but not greater than 12 μm; and
- a cured layer having an average thickness of 0.1 μm or greater but not greater than 10.0 μm,
- wherein the light transmitting base material has, on a side of the cured layer, a surface shape with a flat portion substantially parallel to a film forming surface and a curved raised portion derived from the light transmitting particles, and
- a maximum height Rt between the raised portion and the flat portion is 1 μm or greater but not greater than 15 μm.

6. The light scattering film according to claim 5, wherein a difference ΔRa between an arithmetic average roughness of the cured layer and an arithmetic average roughness of the light transmitting base material on the side of the cured layer in accordance with JIS B 0601 is 0.05 μm or greater but not greater than 0.50 μm.

7. The light scattering film according to claim 5, wherein a ratio $t_{min}/t_{max}$ of a minimum thickness $t_{min}$ to a maximum thickness $t_{max}$ of the cured layer is less than 0.2.

8. The light scattering film according to claim 5, wherein the light transmitting particles are substantially spherical resin particles.

9. The light scattering film according to claim 5, wherein an absolute value of a difference in refractive index between the light transmitting base material and the light transmitting particles is less than 0.09.

10. The light scattering film according to claim 5, which has a light scattering property to give an image clarity of from 5% to 60% as measured through an optical comb having a width of 2 mm by using an image clarity measuring instrument based on JIS K 7105.

11. The light scattering film according to claim 5, wherein a transmitted and scattered light profile as measured using a goniophotometer having a light acceptance angle of 2° satisfies formula (d):

$$0.03 \leq I(4°)/IO \leq 0.07 \quad (d)$$

wherein I(4°) represents an intensity of a transmitted light at a position inclined at 4° to a normal line of the light scattering film and IO represents a light intensity of a light source measured from the front thereof.

12. The light scattering film according to claim 5, wherein an internal haze is from 0.1 to 30% and a surface haze is from 3 to 40%.

13. A polarizing plate comprising a polarizing film and a protective film on at least one side of the polarizing film, the protective film being a light scattering film according to claim 5.

14. An image display device comprising a light scattering film according to claim 5.

15. A transmissive liquid crystal display device comprising: a backlight; a liquid crystal cell; and a polarizing plate according to claim 13 on a backlight side of the liquid crystal cell.

16. A semi-transmissive liquid crystal display device comprising: a backlight; a liquid crystal cell; and a polarizing plate according to claim 13 on a backlight side of the liquid crystal cell.

* * * * *